United States Patent
Chen et al.

(10) Patent No.: US 12,549,492 B2
(45) Date of Patent: Feb. 10, 2026

(54) SEQUENCE NUMBER (SN) SYNCHRONIZATION MECHANISM IN RLC-BASED FORWARDING

(71) Applicant: TELEFONAKTIEBOLAGET LM ERICSSON (PUBL), Stockholm (SE)

(72) Inventors: Xixian Chen, Ottawa (CA); Jun Wang, Nanjing (CN); James Jianfeng Weng, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 707 days.

(21) Appl. No.: 17/276,182

(22) PCT Filed: Sep. 18, 2018

(86) PCT No.: PCT/IB2018/057190
§ 371 (c)(1),
(2) Date: Mar. 15, 2021

(87) PCT Pub. No.: WO2020/058744
PCT Pub. Date: Mar. 26, 2020

(65) Prior Publication Data
US 2022/0030487 A1    Jan. 27, 2022

(51) Int. Cl.
  *H04W 56/00*    (2009.01)
  *H04L 47/34*    (2022.01)
  *H04W 36/08*    (2009.01)

(52) U.S. Cl.
  CPC ............. *H04L 47/34* (2013.01); *H04W 36/08* (2013.01); *H04W 56/002* (2013.01)

(58) Field of Classification Search
  CPC ... H04W 36/08; H04W 56/002; H04W 36/02; H04W 36/00; H04L 47/34
  See application file for complete search history.

(56) References Cited

U.S. PATENT DOCUMENTS

| | | | |
|---|---|---|---|
| 8,880,896 B1 * | 11/2014 | Elliott | H04L 9/0838 713/185 |
| 2008/0069053 A1 | 3/2008 | Kim et al. | |
| 2008/0095116 A1 * | 4/2008 | Kim | H04W 36/02 370/331 |
| 2008/0119189 A1 * | 5/2008 | Chang | H04W 36/02 455/436 |

(Continued)

FOREIGN PATENT DOCUMENTS

| | | | | |
|---|---|---|---|---|
| CN | 101779435 A | 7/2010 | | |
| WO | WO-2018038804 A1 * | 3/2018 | | |
| WO | WO-2018079998 A1 * | 5/2018 | ......... | H04L 63/0428 |

OTHER PUBLICATIONS

Machine English translation of WO 2018079998. (Year: 2023).*

(Continued)

*Primary Examiner* — Peter P Chau
(74) *Attorney, Agent, or Firm* — Sage Patent Group

(57) ABSTRACT

A method, in a network in which a handover of a wireless device occurs, the User Equipment (UE) moving from a source cell to a target cell, is provided. The method comprises at least: (at the source cell) determining a sequence number (SN) related to a data packet; forwarding at the RLC layer data packets to the target cell, the data packets being previously sent to the UE but unacknowledged by the UE and having SNs inferior to the determined sequence number; and sending the determined SN to the target cell. The method further comprises (at the target cell) sending a first data packet with the determined SN to the wireless device; the determined SN being a demarcation line for using different encryption keys. The UE will decrypt the received data packets having SNs inferior to the determined SN using an encryption key from the source cell; and decrypt received packets having SNs superior to the determined SN using an encryption key from the target cell.

15 Claims, 15 Drawing Sheets

(56) References Cited

U.S. PATENT DOCUMENTS

| | | | | |
|---|---|---|---|---|
| 2008/0310368 | A1* | 12/2008 | Fischer | H04L 47/10 370/331 |
| 2009/0124259 | A1* | 5/2009 | Attar | H04L 47/34 455/436 |
| 2009/0175241 | A1* | 7/2009 | Ohta | H04W 36/023 370/331 |
| 2010/0039996 | A1* | 2/2010 | Ohta | H04L 49/9057 370/328 |
| 2012/0129530 | A1 | 5/2012 | Larmo et al. | |
| 2012/0300748 | A1 | 11/2012 | Magnus et al. | |
| 2018/0084464 | A1* | 3/2018 | Ozturk | H04W 36/0069 |
| 2020/0107394 | A1* | 4/2020 | Lee | H04L 1/189 |

OTHER PUBLICATIONS

International Search Report and Written Opinion issued on applicant's corresponding application PCT/IB2018/057190. pp. 1-16.

First Office Action mailed on Aug. 31, 2023 for Chinese Patent Application No. 201880097774.7, 14 pages (includes English translation).

3GPP; Technical Specification Group Radio Access Network; Evolved Universal Terrestrial Radio Access Network (E-UTRAN); X2 application protocol (X2AP) (Release 15); 3GPP TS 36.423 V15.2.0 (Jun. 2018); France; 389 pages.

3GPP; Technical Specification Group Services and System Aspects; General Packet Radio Service (GPRS) enhancements for Evolved Universal Terrestrial Radio Access Network (E-UTRAN) access (Release 15); 3GPP TS 23.401 V15.5.0 (Sep. 2018); France; 410 pages.

3GPP; Technical Specification Group Radio Access Network; Evolved Universal Terrestrial Radio Access (E-UTRA); Packet Data Convergence Protocol (PDCP) specification (Release 15); 3GPP TS 36.323 V15.0.0 (Jul. 2018); France; 51 Pages.

3GPP; Technical Specification Group Radio Access Network; Evolved Universal Terrestrial Radio Access (E-UTRA); Radio Link Control (RLC) protocol specification (Release 15); 3GPP TS 36.322 V15.1.0 (Jul. 2018); France; 45 Pages.

* cited by examiner

SEQUENCE NUMBER (SN) SYNCHRONIZATION MECHANISM IN RLC-BASED FORWARDING

TECHNICAL FIELD

The present description generally relates to wireless communication systems and more specifically to data forwarding during handovers.

BACKGROUND

The handover procedure is a key function in the Long Term Evolution (LTE)/Fifth Generation (5G) network nodes. During a LTE/5G handover, from a source cell to a target cell, data forwarding from the source cell to the target cell is done in the Packet Data Convergence Protocol (PDCP) layer. The handover procedure is explained in more detail below.

Handover Procedure

As an example, an LTE handover (HO) procedure 100 for a UE 110 being handed over from a source cell 120 to a target cell 130 is shown in FIG. 1.

For example, at source cell 120, upon receiving one or more measurement reports from the UE 110 (step 140), the source cell 120 determines if there is a need for the UE 110 to be handed over to another cell, henceforth referred to as a target cell 130 (step 145).

If so, the source cell 120 will send a handover request message to the target cell 130 (step 150). If the handover request is allowed (step 155), the target cell 130 will send a handover request acknowledgement (step 160) to the source cell 120. Then the source cell 120 will send a Radio Resource Control (RRC) connection reconfiguration message containing the handover command to the UE 110 to instruct it to perform a Random Access Channel (RACH) procedure towards the target cell 130 (step 165). If the source cell 120 and the target cell 130 are at different network nodes (e.g. eNBs), the X2 interface (see 3GPP TS36.423 for example) between the different eNBs is used to carry the handover request and handover request acknowledgement messages.

In the meantime, in step 170, the UE 110 synchronizes with the target cell 130 and the source cell 120 will start forwarding data packets to the target cell 130 (step 175). If the source cell 120 and the target cell 130 are at different eNBs, GPRS tunneling protocol (GTP) is used to forward the data packets.

In step 180, the RACH procedure is initiated between the UE 110 and the target cell 130. If the RACH procedure is successful, the UE 110 will send an RRC connection reconfiguration complete message to the target cell 130 to indicate the handover was successful (step 185).

Before explaining in more detail the data forwarding mechanism during handovers, the E-UTRAN protocol layers will be described first.

Evolved-Universal Terrestrial Radio Access Network (E-UTRAN) Protocol Flows and Data Flows FIG. 2 shows a logical diagram 200 of the E-UTRAN protocol layers and the data flows through those layers. Basically, the E-UTRAN protocol layers may have 4 layers, such as the PDCP layer 205, the RLC layer 210, the Media Access Control (MAC) layer 215 and the Physical (PHY) layer 220.

At each layer, the input packets are referred to as Service Data Units (SDU) while the output packets are referred to as Protocol Data Units (PDU). Each PDU is often a PDU header followed by a PDU payload formed by one or more SDUs.

At the PDCP layer 205, the received IP packets (or data packets) 225 may have different sizes. As such, the resulting PDCP SDU 230 sizes may be different. For each incoming data packet 225, the PDCP layer 205 will add a "sequence number" (SN), perform header compression (for the User plane (U-plane) data only) and perform data encryption before adding the PDCP header to form a PDCP PDU 235. It should be noted that:

1. For Control plane (C-plane) data, i.e., Radio Resource Control (RRC) and Non-Access Stratum (NAS) messages, there is an integrity protection. This integrity protection can be disabled if the evolved packet system (EPS) integrity algorithm 0 (EIA0) is configured.
2. For both C-plane data and U-plane data, encryption is performed. This encryption can be disabled if the EPS encryption algorithm 0 (EEA0) is configured.
3. The maximum supported size of a PDCP SDU 230 is 8188 bytes (see e.g. 3GPP Section 4.3.1 TS.36.323).
4. The PDCP sequence number (SN) is encoded into the PDCP SN field of the PDCP data PDU.

At the RLC layer 210, the RLC "sequence number" will be added and segmentation and concatenation will be performed such that one RLC SDU 240 may be split and carried by several RLC PDUs 245 or several RLC SDUs 240 may be concatenated to form one RLC PDU payload. The segmentation and concatenation are performed to better match the available radio data rate. It is noteworthy to mention that there are three modes at the RLC layer 210: Transparent Mode (TM), Unacknowledged Mode (UM), and Acknowledged Mode (AM).

1. RLC TM mode is used for transmissions of paging messages, system information blocks, and SRB0 messages. In this mode, there is no header for RLC PDU.
2. RLC UM mode is used for transmissions of delay sensitive packets. Often, this means VoIP packets, for example. In this mode, each RLC PDU has a header containing an RLC sequence number (SN) field.
3. RLC AM mode is used for transmissions of all other types of messages and packets not covered by RLC TM or UM. RLC AM has an automatic repeat request (ARQ) mechanism to retransmit unacknowledged packets. In this mode, each RLC PDU has a header containing an RLC SN field.

It should be noted that the PDCP and RLC data packets have their own sequence numbers. Also, it should be understood that the terms "PDUs" and "packets" are used interchangeably in this disclosure. As such, RLC packets or RLC data packets or RLC PDUs refer to the same thing. In the same manner, PDCP packets or PDCP data packets PDCP PDUs refer to the same thing.

At the MAC layer 215, each RLC PDU 245 is treated as a MAC SDU 250 and the MAC layer 215 will add a MAC header and pad bits to form a MAC PDU 255, which is a transport block 260 to be transmitted later at the PHY layer 220.

Now, data forwarding in handovers will be explained in more detail.

Data Forwarding in Handovers

The data packets being forwarded during the handover from the source cell 120 to the target cell 130 are from the PDCP layer 205 and they are unencrypted PDCP data packets. This data forwarding is used only in the Radio Layer Control (RLC) Acknowledged Mode (AM), where each RLC Packet Data Unit (PDU) sent to the UE 110 must be acknowledged by the UE in the RLC status report. The RLC status report is sent by the UE 110 upon receiving an RLC poll request (pull bit) from a network node (such as an eNB) or on expiry of the t-Reordering timer for the detection of reception failures of the RLC data PDUs. As a note, the PDCP data packets are encrypted by the target cell, using the key encryption of the target cell.

During the handover, all unacknowledged PDCP data packets (unacknowledged by the UE), e.g. PDCP Service Data Units (SDUs), will need to be forwarded to the target cell 130 for encryption again and retransmission.

Handovers often happen when the UEs are in a cell edge, where the radio data rates are often low. In this case, a PDCP PDU 235 (see FIG. 3) is often split into multiple smaller pieces and carried out by multiple RLC PDUs 245. This is illustrated in FIG. 3, where one or more PDCP PDU 235 is often split and carried out by one or more RLC PDUs 245. For example, the PDCP PDU 235 with a sequence number m+2 is split in different segments and is carried out by three RLC PDUs 245 with sequence number k+2, k+3 and k+4.

It is noteworthy to mention that:

The encryption key at the target cell is different from the one in the source cell. Since the PDCP data packets for data radio bearers sent from a cell is encrypted using the encryption key of this cell, the PDCP SDUs will need to go through encryption again at the target cell.

For 5G, the RLC concatenation is not supported so the RLC SDUs are only split.

After the handover, all the transmitted RLC data units from the source cell are discarded and the RLC entities (e.g. radio bearers) are reset.

Problems with Existing Solutions

The existing data forwarding solution in the handover procedure is designed for the PDCP layer 205, which has the following problems:

During the handover from the source cell to the target cell, even if multiple RLC PDUs 240 corresponding to the same PDCP PDU 235 have been sent, as long as there exists one RLC PDU 240 that is not successfully acknowledged by the UE, the entire PDCP data packet will have to be forwarded to the target cell again in a retransmission. This is done for all unacknowledged PDCP SDUs 230.

The problem with this retransmission is that all the RLC PDUs (corresponding to the same PDCP PDU), which have been successfully received at the target cell, will be retransmitted to the target cell again. That is a complete waste of radio resources, which is a limited resource.

At the source cell: Since the forwarding is done at the PDCP layer, the source cell has to either reversely deliver all the PDCP packets from the unacknowledged RLC PDUs to the PDCP layer to decrypt them into the original PDCP plaintext or to keep duplicate copies of the PDCP packets, one copy for the plain content/data and the other copy for the encrypted content/data.

At the target cell: All the unacknowledged PDCP packets need to be forwarded to the target cell and retransmitted to the UE. Such a duplicate traffic volume wastes radio resources.

This waste will become larger when there are a lot of cell edge UEs for handover. That is often the case in dense urban deployments.

This waste will become even larger in 5G systems where the throughput is 10 or even 100 times more than that in the current LTE system. If all the RLC parameters for polling requests and RLC status reports are unchanged, more and more PDCP SDUs will be unacknowledged during handovers and will need to be retransmitted.

For inter-eNB handovers, the X2 interface is used to carry the data being forwarded from one eNB to another. That means that the PDCP data forwarding procedure imposes a big burden on the X2 interface.

As such, there is a need for an improved data forwarding procedure during handovers.

SUMMARY

According to a first aspect, some embodiments include a method performed by network node of a source cell (first network node) during a handover of a User Equipment, form the source cell to a target cell. The method generally comprises: determining a sequence number related to a data packet; forwarding a first set of one or more data packets to the target cell, the first set of one or more data packets being previously sent to the UE but unacknowledged by the UE, and having respective sequence numbers inferior to the determined sequence number; forwarding to the target cell a second set of one or more data packets, from which a third set of one or more data packets are generated, the third set of one or more data packets having respective sequence number equal or superior to the determined sequence number; and sending the determined sequence number to the target cell.

According to second aspect, some embodiments include a network node of the source cell (first network node) configured, or operable, to perform one or more functionalities of the first network node (e.g. actions, operations, steps, etc.) as described herein.

In some embodiments, the first network node may comprise one or more communication interfaces configured to communicate with one or more other radio nodes and/or with one or more network nodes, and processing circuitry operatively connected to the communication interface, the processing circuitry being configured to perform one or more functionalities of the first network node as described herein. In some embodiments, the processing circuitry may comprise at least one processor and at least one memory storing instructions which, upon being executed by the processor, configure the at least one processor to perform one or more functionalities of the first network node as described herein.

In some embodiments, the first network node may comprise one or more functional modules configured to perform one or more functionalities of the first network node as described herein.

Some embodiments include a non-transitory computer-readable medium storing a computer program product comprising instructions which, upon being executed by processing circuitry (e.g., at least one processor) of the first network node, configure the processing circuitry to perform one or more functionalities of the first network node as described herein.

According to a third aspect, there is provided a method for forwarding data packets during a handover of a UE from a source cell to a target cell. The method comprises: receiving a sequence number related to a data packet from the source cell; receiving a first set of one or more data packets from the source cell, the first set of one or more data packets being previously sent to the UE but unacknowledged by the UE and having respective sequence numbers inferior to the determined sequence number; receiving from the source cell a second set of one or more data packets, from which a third set of one or more data packets are generated from the second set, the third set of one or more data packets having respective sequence numbers equal or superior to the determined sequence number.

According to a fourth aspect, some embodiments include a network node of the target cell (second network node) configured, or operable, to perform one or more functionalities of the second network node (e.g. actions, operations, steps, etc.) as described herein.

In some embodiments, the second network node may comprise one or more communication interfaces configured to communicate with one or more other radio nodes and/or with one or more network nodes, and processing circuitry operatively connected to the communication interface, the processing circuitry being configured to perform one or more functionalities of the second network node as described herein. In some embodiments, the processing circuitry may comprise at least one processor and at least one memory storing instructions which, upon being executed by the processor, configure the at least one processor to perform one or more functionalities of the second network node as described herein.

In some embodiments, the second network node may comprise one or more functional modules configured to perform one or more functionalities of the second network node as described herein.

Some embodiments include a non-transitory computer-readable medium storing a computer program product comprising instructions which, upon being executed by processing circuitry (e.g., at least one processor) of the second network node, configure the processing circuitry to perform one or more functionalities of the second network node as described herein.

According to a fifth aspect, the second network node is also configured to perform the following method: sending to the wireless device a first data packet having a first sequence number; receiving an acknowledgement associated with the sent first data packet; sending a first set of one or more data packets having respective sequence numbers inferior to the first sequence number; and sending a second set of one or more data packets having respective sequence numbers superior to the first sequence number.

According to a sixth aspect, there is provided a method in a wireless device for synchronizing with a target cell, after a handover from a source cell to the target cell. The method comprises: receiving a first data packet from the target cell, the first data packet having a first sequence number; sending an acknowledgement for the receipt of the first data packet to the target cell; receiving one or more data packets having respective sequence numbers inferior to the first sequence number; receiving one or more data packets having respective sequence numbers superior to the first sequence number; decrypting the one or more packets having respective sequence numbers inferior to the first sequence number using an encryption key from the source cell; decrypting the one or more packets having respective sequence numbers superior to the first sequence number using an encryption key from the target cell.

According to a seventh aspect, some embodiments include a wireless device configured, or operable, to perform one or more functionalities of the first network node (e.g. actions, operations, steps, etc.) as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities of the wireless device as described herein. In some embodiments, the processing circuitry may comprise at least one processor and at least one memory storing instructions which, upon being executed by the processor, configure the at least one processor to perform one or more functionalities of the wireless device as described herein.

In some embodiments, the wireless device may comprise one or more functional modules configured to perform one or more functionalities of the wireless device as described herein.

Some embodiments include a non-transitory computer-readable medium storing a computer program product comprising instructions which, upon being executed by processing circuitry (e.g., at least one processor) of the wireless device, configure the processing circuitry to perform one or more functionalities of the wireless device as described herein.

According to an eight aspect, there is provided a method in a communication network in which a handover of a wireless device occurs, the wireless device moving from a source cell to a target cell. The method comprises: (at the source cell): determining a sequence number related to a data packet;
  forwarding a first set of one or more data packets to the target cell, the first set of one or more data packets being previously sent to the UE but unacknowledged by the UE, and having respective sequence numbers inferior to the determined sequence number; forwarding to the target cell a second set of one or more data packets, from which a third set of one or more data packets are generated, the third set of one or more data packets having respective sequence number equal or superior to the determined sequence number; and sending the determined sequence number to the target cell;
  (at the target cell): sending a first data packet with the determined sequence number to the wireless device;
  receiving an acknowledgement associated with the sent first data packet from the wireless device; sending a first set of one or more data packets having respective sequence numbers inferior to the first sequence number; and sending a second set of one or more data packets having respective sequence numbers superior to the first sequence number; (at the wireless device): decrypt the one or more packets having respective sequence numbers inferior to the first sequence number using an encryption key from the source cell; and decrypt the one or more packets having respective sequence numbers superior to the first sequence number using an encryption key from the target cell.

The advantages/technical benefits of the embodiments of the present disclosure are as follows:
  Reduce the number of retransmissions of RLC PDUs at the target cell so as to free up radio resources and to increase the cell throughput.
  Allow the unacknowledged RLC PDUs to be directly forwarded to the target side/cell through a new tunnel/channel between the source cell and the target cells. Accordingly, the source cell neither has to return all the RLC packets (PDCP packets) including the unacknowledged RLC PDUs to the PDCP layer for deciphering/decryption nor it needs to simultaneously keep duplicate copies of the PDCP packers for both the plain texts and ciphered packets. This can greatly simplify the processing of the source cell and reduce the interruption time during handovers.
  Since only the unacknowledged RLC PDUs (carrying segments of PDCP PDUs) are forwarded through a new channel between the source cell and target cell (instead of the whole set of PDCP PDUs), the traffic burden on the X2 interface is relieved.

Unlike the existing/current solution, which needs to reset the RLC protocol during handovers, the embodiments of the present disclosure have no RLC reset during the handovers so that the UE's implementation can be simplified and the RLC service interruption can be also avoided. Accordingly, such uninterrupted connection continuity can support more frequent and consecutive handovers, such as cell A→cell B→cell C or cell A→cell B→cell A.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
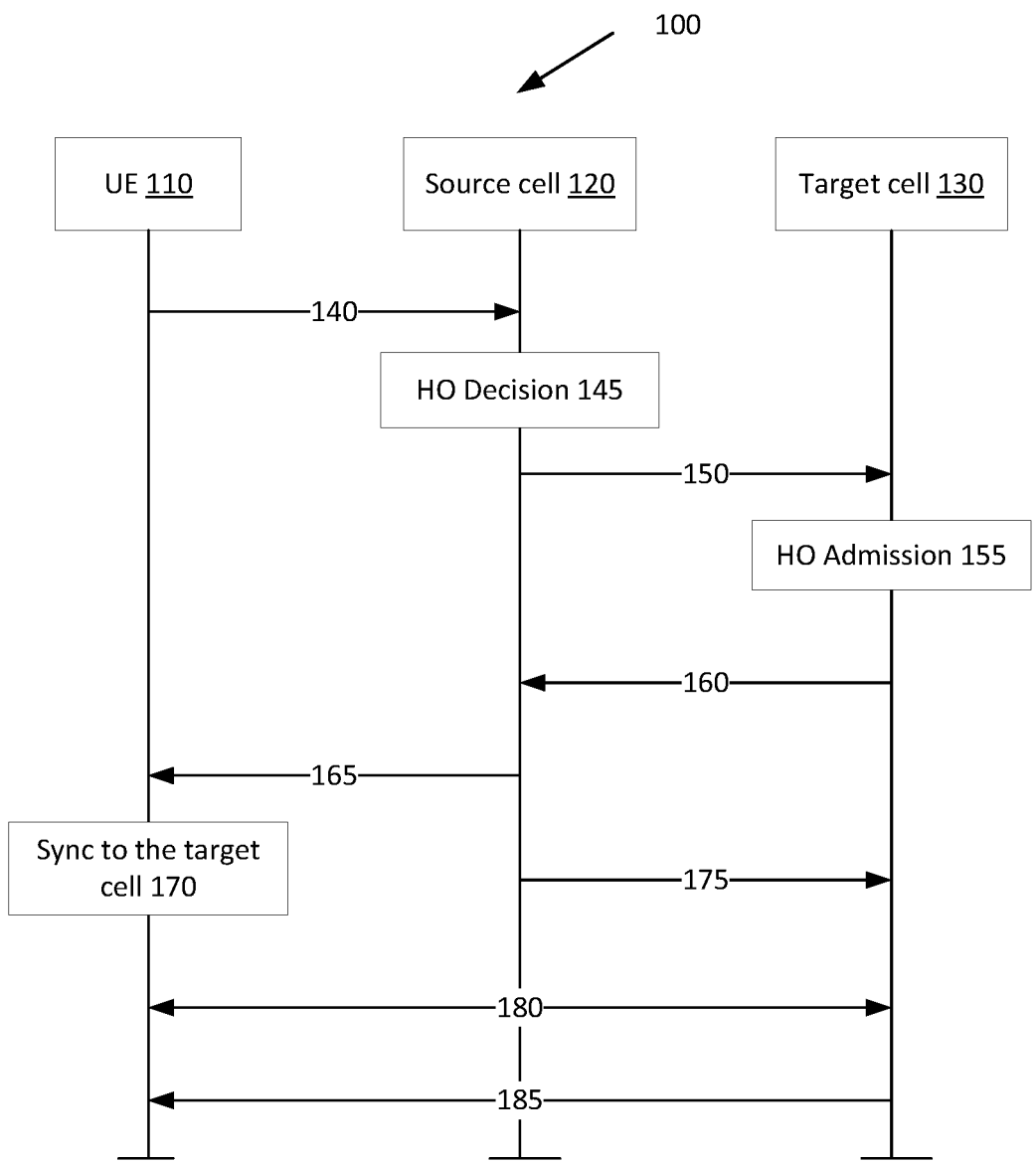
FIG. 1 illustrates a handover procedure of a UE from a source cell to a target cell.
Figure 2:
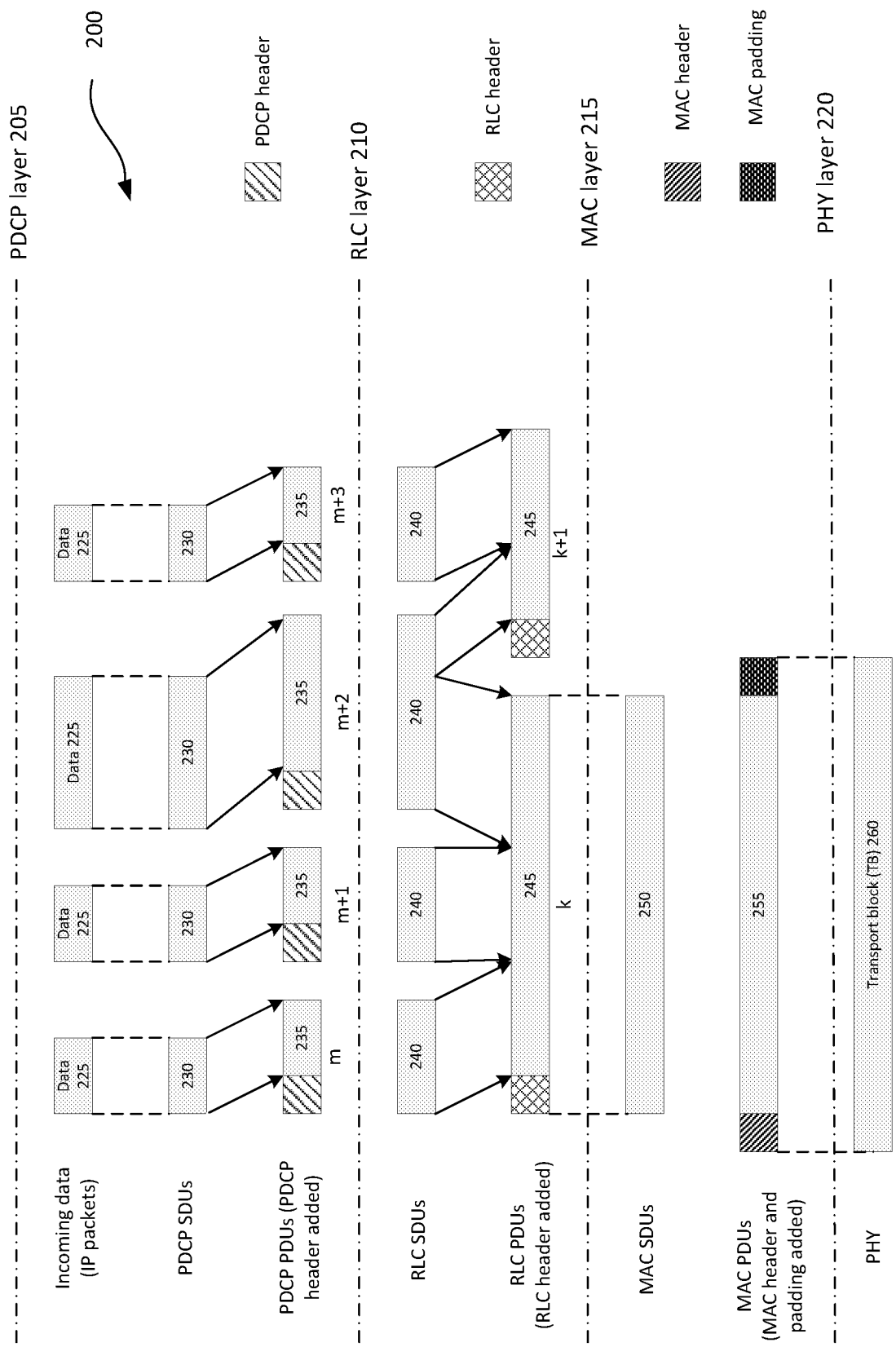
FIG. 2 is a schematic diagram of data flows in E-UTRAN protocol layers.
Figure 3:
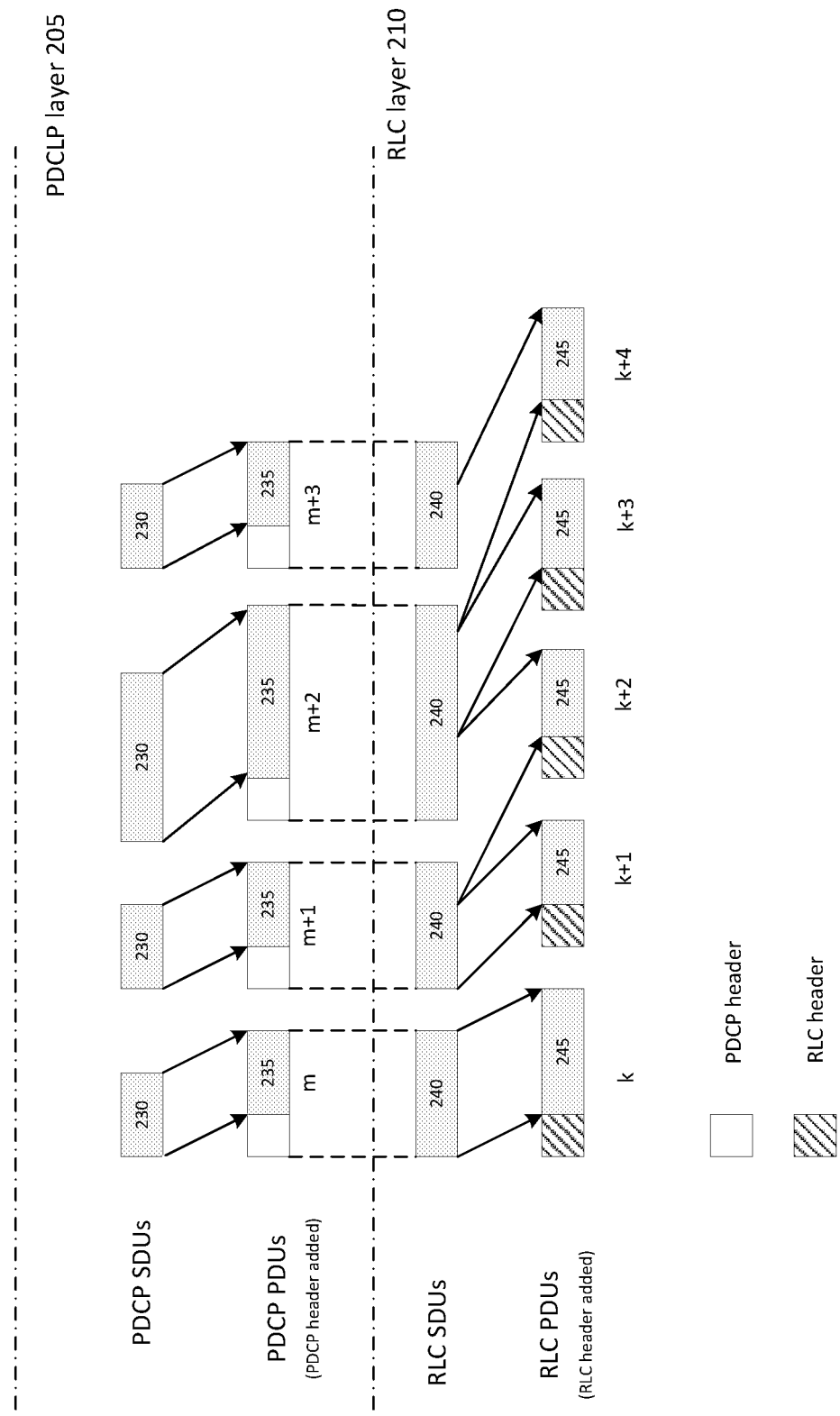
FIG. 3 is a schematic diagram of a PDCP data packet forwarding mechanism in a handover of a UE from a source cell to a target cell.

The embodiments set forth below represent information to enable those skilled in the art to practice the embodiments.

Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Generally stated, embodiments of the present disclosure provide RLC based packet forwarding methods during handovers. For example, the packet forwarding is mainly done at the RLC layer instead of the PDCP layer.

For example, in the handover from a source cell to a target cell, the source cell will forward any unacknowledged RLC PDUs instead of unacknowledged PDCP SDUs to the target cell. By so doing, unnecessary RLC PDU retransmissions can be eliminated during the handover. It should be noted that the term "plaintext" in this disclosure refers generally to data or content that is not encrypted.

Furthermore, in addition to forwarding its own unacknowledged RLC PDUs, the source cell may also forward the RLC PDUs received from a previous cell, which contain the PDCP PDUs encrypted using the encryption key of the previous cell.

In order to maintain a RLC state continuity without a protocol reset, the present embodiments define a new message (referred to as the RLC SN transfer message) between the source and target cells. The message includes a RLC SN (e.g. referred to as N_firstRlcPduFromTarget) determined by the source cell, to indicate to the target cell when to start its normal RLC transmission.

Moreover, a synchronization procedure between the UE and target cell, after the handover is finished, can be established, based on the determined RLC SN. For example, the determined RLC SN can be used as an indication to change the encryption key at the UE for decrypting different received RLC packets.

Figure 4:
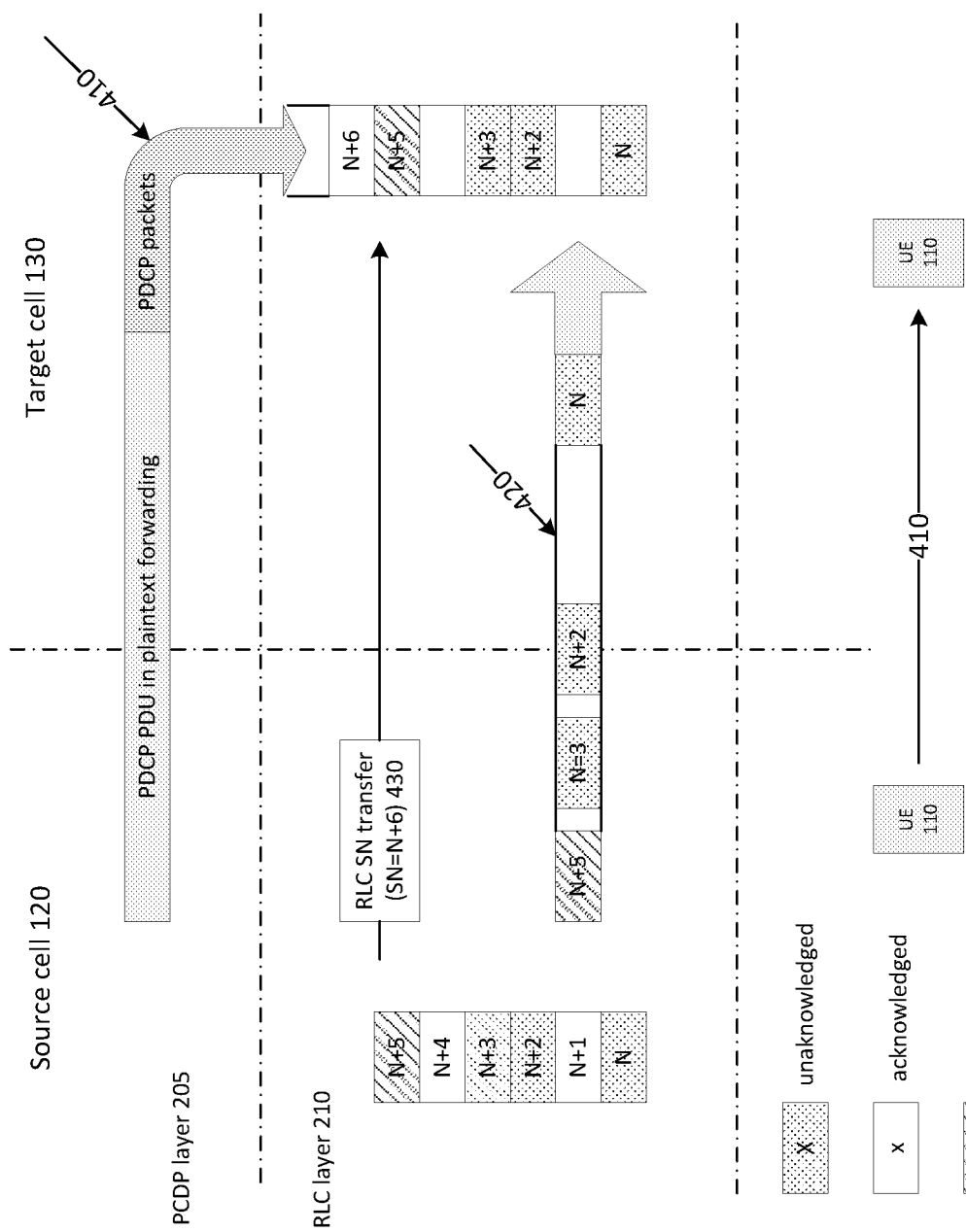
FIG. 4 is an illustration of a RLC-based packet forwarding data flow according to an embodiment.

For instance, FIG. 4 is an illustration of an example 400 of a RLC-based forwarding mechanism during a handover of a UE 110, from a source cell 120 to a target cell 130, according to an embodiment.

As shown by the arrow 410, during the handover, the UE 110 moves from the source cell 120 to the target cell 130. It should be noted that the source cell is serviced by a source network node and the target cell is serviced by a target network node. Therefore, during the handover, the UE 110 disconnects from the source network node in order to connect to the target network node. Once the handover is finished, the UE is connected to the target cell. It should be noted that the terms "source cell" and "source network node" can be used interchangeably and the terms "target cell" and target network node" can be used interchangeably as well when describing the functionalities involved in a handover. In other words, the functions and actions attributed to the source cell or target cell are actually performed by the source network node or target network node respectively.

The example 400 shows a first forwarding channel 415 at the PDCP layer 205. Through this channel, the PDCP packets are sent to the target cell 130 in plain text (no encryption). Once the target cell 130 receives the PDCP packets, it encrypts them using its own encryption key and segments them into RLC data packets at the RLC layer 210. For example, RLC packet N+6 is an encrypted packet from the PDCP forwarding channel 410.

However, before the handover or during the handover, the source cell 120 may have sent RLC packets to the UE, some of which may not have been acknowledged by the UE yet (e.g. RLC packets N, N+2 and N+3). Those packets come from PDCP packets that have been encrypted by the source cell using its own encryption key. As mentioned above, in the existing solutions, the source cell would decrypt the PDCP packets corresponding to all the RLC packets sent to the UE, whether acknowledged or not. Then, the plain text PDCP packets can be forwarded to the target cell, using the first forwarding channel 415, for example. Embodiments of the present disclosure propose a second channel 420, for forwarding RLC packets at the RLC layer 210. More specifically, the source cell 120 will forward only the unacknowledged and unsent RLC packets to the target cell 130, using the second channel 420. For example, as illustrated in FIG. 4, the source cell forwards only RLC packets N, N+2, N+3 and N+5 to the target cell. The source cell knows the sequence number of all the RLC packets. As such, it can determine the sequence number of the next packet that can be forwarded to the target cell, through the first channel 410, at the PDCP layer. In other words, the next packet corresponds to the packet that comes next after the last RLC packet in the source cell's buffer (in a sequential order). Then, the source cell 120 sends a message 430 (denoted as RLC SN transfer message) to the target cell 130, the message including the determined sequence number, referred to as the RLC SN. This sequence number can be used by the target cell to perform a synchronization procedure with the UE, as will be described hereinbelow. In the example 400, the RLC SN is equal to N+6. The RLC SN transfer message can be sent over an interface between the source cell 120 and target cell 130.

The buffer at the target cell 130 includes the RLC packets forwarded through the second channel 420 and the RLC packets containing the PDCP packets forwarded through the first channel 410. As such, the RLC packets at the target cell have been encrypted using different encryption keys. For example, the RLC packets coming from the second channel 420 are encrypted with the source cell encryption key. And the RLC packets generated from PDCP packets forwarded from the first channel 410 are encrypted using the encryption key of the target cell 130. The target cell knows which encryption key was used for all the RLC packets thanks to the received message (RLC SN transfer message) which includes the determined sequence number. Indeed, the determined sequence number corresponds to a demarcation line between RLC packets being encrypted with the source cell's encryption key and the target cell's encryption key. For example, all the subsequent RLC packets (from the determined SN) contain PDCP packets encrypted using the target cell's encryption key. The determined sequence number is also used by the target cell to know when to start the normal RLC packets transmission, i.e. starting from the determined sequence number, for example. A normal RLC packets transmission refers to a transmission of RLC packets containing PDCP PDUs which are encrypted by the target cell.

After the handover, the target cell 130 performs a synchronization procedure with the UE (e.g. step 170 of FIG. 1). This synchronization procedure allows the UE to be synchronized with the target cell in order to know which encryption key to use for the different received RLC packets. For example, for all the RLC packets having sequence numbers inferior to the determined SN, the source encryption key should be used to decrypt these packets. For all the RLC packets subsequent to the determined SN, the target cell encryption key should be used.

To do the synchronization procedure, the target cell 130 first sends the RLC PDU having the determined SN to the UE. Until this RLC PDU is acknowledged by the UE, the target cell suspends the transmission of any other RLC PDUs. Once the RLC PDU having the determined SN is successfully acknowledged by the UE, the target cell and the UE are synchronized with each other. The target cell can then resume sending to the UE the RLC PDUs that have come from the source cell or even previous cells and RLC PDUs generated at the target cell. It should be noted that once the synchronized is done, the UE knows that the RLC PDU with the determined SN is used as a demarcation point. As such, the UE can decrypt the RLC packets using the correct encryption based on the sequence numbers. For example, for RLC packets with a sequence number superior to the RLC SN will be decrypted using the target cell's encryption key. The RLC packets with a SN inferior to the RLC SN will be decrypted using the source cell's encryption key.

Now an implementation example of the packet forwarding mechanism according to the embodiments of the disclosure, for the different nodes, during a handover, is described below.

Figure 5:
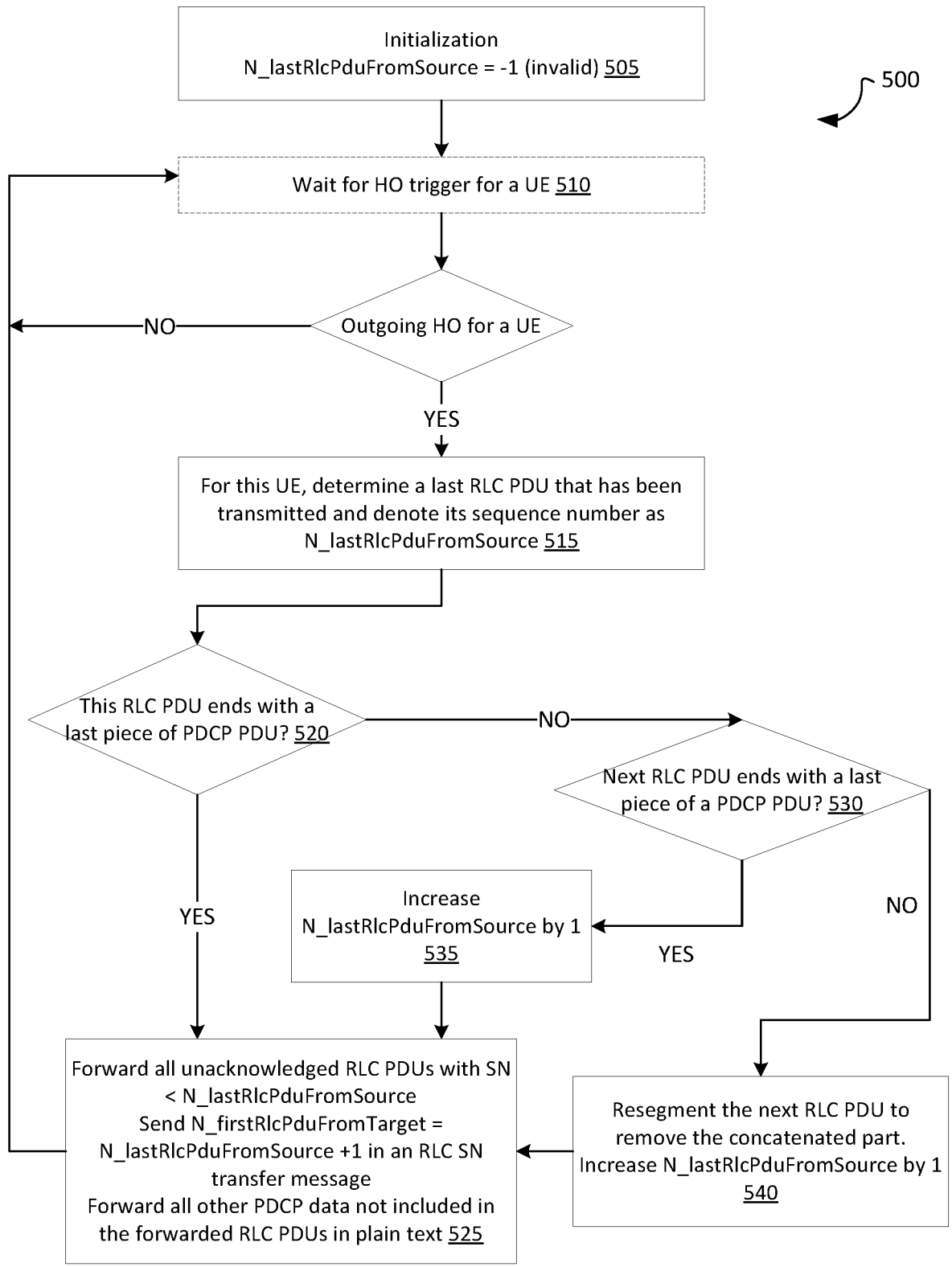
FIG. 5 is a flow chart of operations of at the source cell during the handover, in accordance with some embodiments.

A) at the Source Cell, with Reference to FIG. 5:

During the handover, the source cell 120 needs to determine the RLC sequence number (SN) as a starting sequence number for the target cell to resume its RLC transmission after the handover. The RLC SN can be denoted as N_firstRlcPduFromTarget. How to decide on or assign the SNs in general and "N_firstRlcPduFromTarget" in particular is up to the source cell implementation. However, the SNs need to fulfill one criterion, i.e. a complete PDCP PDU should not be separated into more than one RLC PDU across the N_firstRlcPduFromTarget SN boundary. This means that, the complete PDCP PDU should be contained in all the RLC PDUs with a SN<N_firstRlcPduFromTarget for example. In this way, it is guaranteed that all PDCP PDUs encrypted using the source cell encryption key are carried in the RLC PDUs with SN<N_firstRlcPduFromTarge, regardless of if those RLC PDUs are sent or not. Alternatively, the complete PDCP PDU should be contained in all the RLC PDUs with a SN>N_firstRlcPduFromTarget for example. Note that N_firstRlcPduFromTarget is notified to the target cell using a message called the "RLC SN transfer", for example.

In order to determine the SN corresponding to N_firstRlcPduFromTarget, the source cell first initializes a parameter for containing the SN for a last RLC PDU from the source cell (step 505). This parameter can be denoted as N_lastRlcPduFromSource. This parameter can be initialized with any initial value. For example, N_lastRlcPduFromSource could be initialized with an invalid value, such as −1, as illustrated in FIG. 5.

In step 510, the source cell 120 waits for outgoing handover triggers.

If there are no outgoing handover triggers, the source cell stays in step 510 and continue to wait for outgoing handovers.

When an outgoing handover is needed for a UE, i.e. the source cell detects a handover trigger, the source cell determines a last RLC PDU that has been transmitted to the UE and assign its sequence number to N_lastRlcPduFromSource (step 515). For instance, in the example of FIG. 4, the parameter N_lastRlcPduFromSource would be given the value of N+5.

In step 520, the source cell will check if a PDCP PDU is across this last RLC PDU boundary. As an example, the source cell will check if the last RLC PDU ends with a last piece of a PDCP PDU.

If positive, i.e. the last RLC PDU ends with the last piece or segment of PDCP PDU, then in step 525, the source cell can perform the following actions:
  forward all the unacknowledged and unsent RLC PDUs with SN<N_lastRlcPduFromSource to the target cell;
  determine the RLC SN as N_firstRlcPduFromTarget=N_lastRlcPduFromSource+1;
  send the RLC SN transfer message to the target cell, the RLC SN message containing the determined SN N_firstRlcPduFromTarget to indicate the sequence number that the target cell should use for sending its very first RLC PDU to the UE;
  forward all the other PDCP packets not included in the RLC PDUs that have SN<N_lastRlcPduFromSource to the target cell; as a note, those PDCP packets are sent in plaintext.

If the answer is negative in step 520, the source cell will further check if the next RLC PDU ends with a last piece of a PDCP PDU (step 530).

If positive, the source cell increases N_lastRlcPduFromSource by 1 to indicate that the next RLC PDU is a last RLC PDU from the source cell even though this next RLC PDU may not have been transmitted yet (step 535). Once the N_lastRlcPduFromSource parameter is determined, the source cell goes to step 525 to perform the mentioned actions.

If the answer is negative in step 530, i.e. the next RLC PDU does not end with a last piece of a PDCP PDU, the source cell will re-segment the next RLC PDU to remove the concatenated part such that the next RLC PDU contains a last piece of a PDCP PDU (step 540). After the re-segmentation, the source cell increases the parameter N_lastRlcPduFromSource by 1 to indicate that the next RLC PDU is a last RLC PDU from the source cell. Once the N_lastRlcPduFromSource parameter is determined, the source cell goes to step 525 to perform the mentioned actions.

Figure 6:
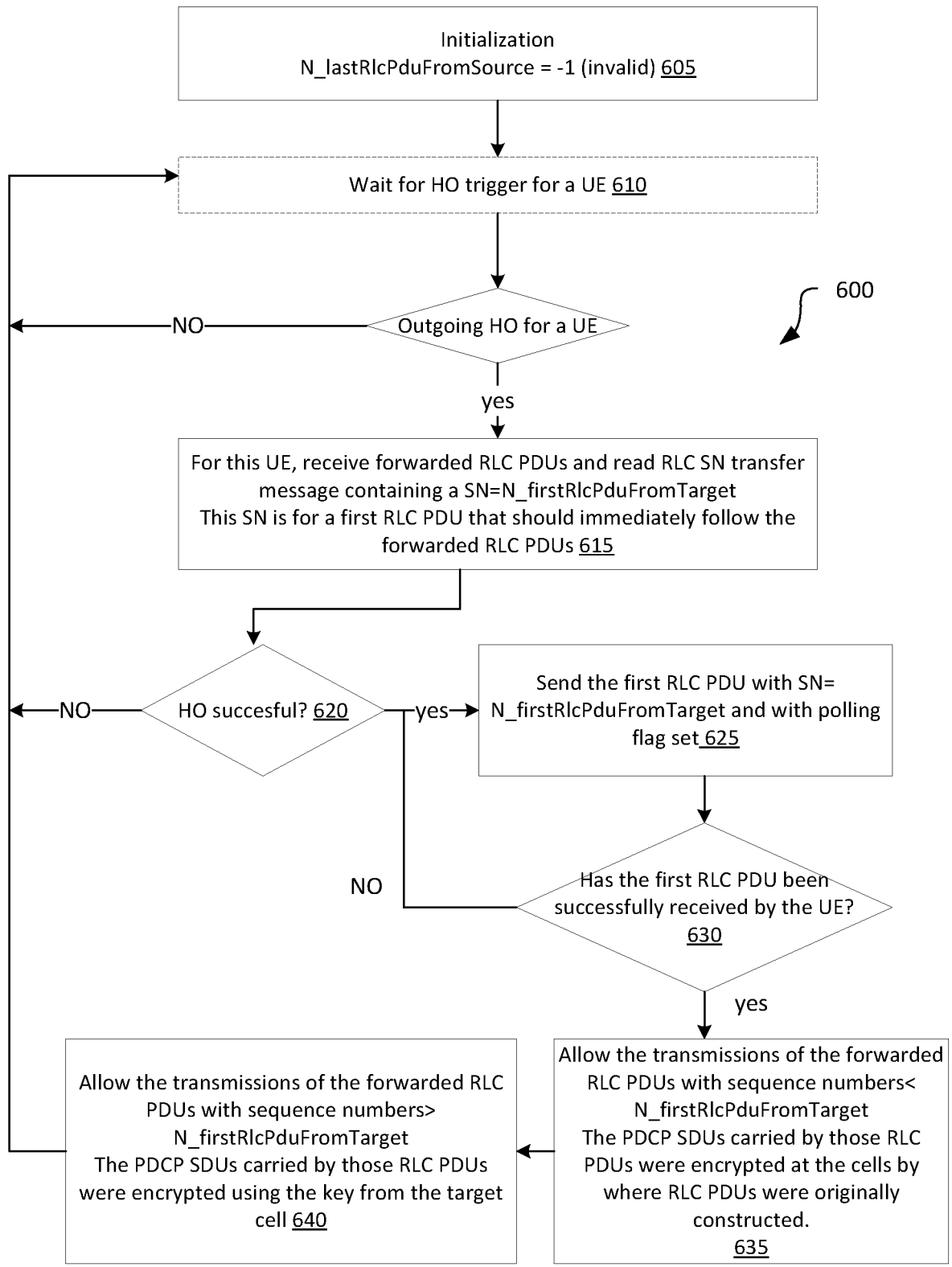
FIG. 6 is a flow chart of operations of at the target cell during the handover, in accordance with some embodiments.

B) At the Target Cell, with Reference to FIG. 6:

During a handover, the target cell 130 needs to receive a message referred to as the RLC SN transfer, from the source cell 120. The message comprises the determined SN, denoted as "N_firstRlcPduFromTarget".

Therefore, in step 605, before any handover occurs, the target cell initializes the parameter N_firstRlcPduFromTarget to any initial value, such as an invalid value (−1).

In step 610, the target cell waits for an incoming handover for the UE (or handover triggers).

If the target cell does not detect any handover triggers, the target cell keeps waiting.

If the target cell detects an incoming handover that is needed for the UE, then, the target cell receives the forwarded unacknowledged RLC PDUs from the source cell, the forwarded PDCP data in plain text that were not included in the forwarded RLC PDUs (step 615). The target cell also receives the message called "RLC SN transfer" which contains the determined SN, that immediately follows the sequence numbers of the forwarded RLC PDUs (step 615 as well). The target cell will also assign this determined SN to the parameter N_firstRlcPduFromTarget.

In step 620, the target cell checks if the handover was successful. If not, no further processing is needed (the existing procedure handling a failed handover will be performed, the description of which is out the scope of this disclosure). The target cell can return to step 610 and wait for another handover.

If the handover was successful, the target cell then sends a first RLC PDU to the UE (step 625). The first RLC PDU has the sequence number given by N_firstRlcPduFromTarget and it contains a PDCP SDU encrypted using the encryption key from the target cell. For example, the PDCP SDU carried by the first RLC PDU is either one from the forwarded PDCP data that have not been included in the forwarded RLC PDUs or a dummy PDCP SDU if no plain text PDCU PDU is received from source cell. The polling flag in the header of the first RLC PDU can be set to notify the UE to report the RLC status. Note that the target cell at this point will not send any other RLC PDUS, either forwarded RLC PDUs from the source cell or any other new RLC PDUs constructed based on the forwarded PDCP data packets.

In step 630, the target cell checks if the first RLC PDU was received successfully by the UE, based on the RLC status report from the UE, for example.

If yes, the target cell will proceed with normal RLC transmissions (step 635). For example, the target cell transmits the RLC PDUs, forwarded at the RLC layer, to the UE. These RLC PDUs have a sequence number inferior to N_firstRlcPduFromTarget. As a note, the PDCP PDUs carried by those RLC PDUs were encrypted using the source cell encryption key.

In step 640, the target cell transmits the RLC PDUs with sequence numbers superior to N_firstRlcPduFromTarget. As a note, the PDCP PDUs carried by those RLC PDUs were encrypted using the target cell encryption key.

If the answer is no in step 630, the target cell will retransmit the first RLC PDU to the UE. The existing error handling procedure can be followed if a maximum number of retransmissions is reached and the description of which is out the scope of this disclosure.

Figure 7:
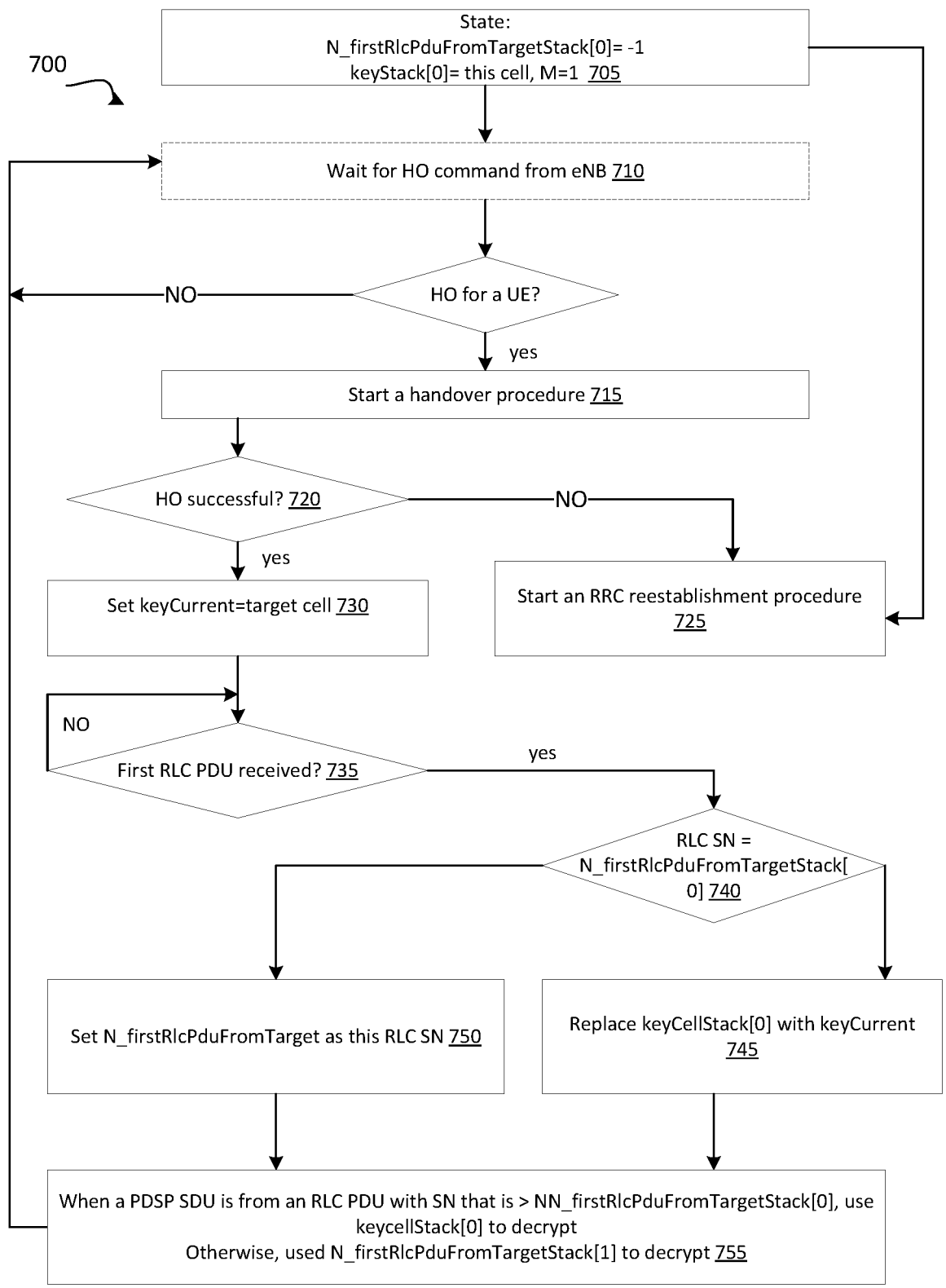
FIG. 7 is a flow chart of operations of at the wireless device after the handover, in accordance with some embodiments.

C) at the UE, with Reference to FIG. 7:

In this example, a handover path involving multiple consecutive cells is considered. As such, the UE has an array to record all the determined SNs (denoted as N_firstRlcPduFromTarget) received from the RLC SN transfer messages. The array is denoted as N_firstRlcPduFromTargetStack[ ]

with M as its depth. The UE also has an array for storing the different encryption keys that may be used to decrypt the different PDCP packets from the different cells encryption keys. This array is denoted as keyCellStack[ ]. These arrays are needed when the UE does multiple handovers before the UE receives all the corresponding RLC PDUs from a cell in the handover path.

In step 705, the UE first initializes the state of the arrays for recording the RLC sequence numbers (SN) and encryption keys, with any initialized values. For example, N_firstRlcPduFromTargetStack[0] can be initialized to −1 (N_firstRlcPduFromTargetStack[0]=keyCellStack[0] is initialized with the encryption key of the cell to which the UE is connected to (keyCellStack[0]=this cell) and the depth of the arrays is initialized to 1 (M=1).

In step 710, the UE waits for handover commands.

If no handover commands are received, the UE continue to wait for handover commands.

If the UE receives a handover command to handover from the current camping cell (referred to as the source cell) to the target cell, the UE will start a handover procedure (step 715).

In step 720, the UE will check if the handover is successful, the success of the handover being determined by whether or not the target cell has received an RRC reconfiguration complete message (See FIG. 1).

If the handover is not successful, an existing RRC reestablishment procedure will start in step 725.

If the handover is successful, the UE will set the encryption key parameter (keyCurrent) to the encryption key of the target cell (i.e. keyCurrent=target cell), in step 730. This key will be used to decipher or decrypt a first RLC PDU coming from this cell (i.e. target cell).

In step 735, the UE determines if it has received a first RLC PDU.

If the first RLC PDU is received, the UE then checks if the SN of the first RLC PDU is equal to the value from N_firstRlcPduFromTargetStack[0] to determine if this is a duplicated RLC PDU that was received earlier from a different cell or not (step 740).

If yes, the UE will replace keyCellStack[0] with keyCurrent to indicate that the cell for the encryption key index [0] is the current cell (step 745). As N_firstRlcPduFromTargetStack[0] is the same as the SN of the first RLC PDU from the current cell, there is no need to update N_firstRlcPduFromTargetStack[0].

If the answer is no in step 740, the UE will push the SN of the first RLC PDU to the stack array as N_firstRlcPduFromTargetStack[0] (step 750). All the previous received SNs will be shifted down in this stack array. As there were "M" SNs in N_firstRlcPduFromTargetStack[ ], after the push, there will be "M+1" SNs with:

N_firstRlcPduFromTargetStack[M]=N_firstRlcPduFromTargetStack[M−1],

N_firstRlcPduFromTargetStack[M−1]=N_firstRlcPduFromTargetStack[M−2],

. . .

N_firstRlcPduFromTargetStack[1]=N_firstRlcPduFromTargetStack[0],

N_firstRlcPduFromTargetStack[0]=the latest SN of the first RLC PDU.

At this point, M is increased by 1 to become M+1.

In step 755, using the values in N_firstRlcPduFromTargetStack[ ] and keyCellStack[ ], the PDCP PDUs from the received RLC PDUs can be decrypted accordingly. For example, PDCU SDUs received from RLC PDUs with SN≥N_firstRlcPduFromTargetStack[0] should be deciphered using the key from keyCellStack[0], all PDCU SDUs received earlier and from RLC PDUs with SN≥N_firstRlcPduFromTargetStack[1] should be deciphered using the key from keyCellStack[1], so on so forth.

As there are M elements in both N_firstRlcPduFromTargetStack[ ] and keyCellStack[ ], there is provided that N_firstRlcPduFromTargetStack[M−1]=−1 (as it was initialized that way) and keyCellStack[M−1] holds the source cell key for a very first handover. When all RLC PDUs with SN<N_firstRlcPduFromTargetStack[M−2] have been received, the UE will set N_firstRlcPduFromTargetStack[M−2]=−1 and delete N_firstRlcPduFromTargetStack[M−1] and keyCellStack[M−1] to indicate that all earlier RLC PDUs before that SN and corresponding to that cell have been received so the SN and key information can be deleted as long as M>1. If M>1, the UE will decrease M by 1.

Now some use cases of the embodiments of the present disclosure will be described.

A) UE Handover from Cell #1 to Cell #2

A set of PDCP SDUs are encrypted at cell #1. Some of them may have been sent from cell #1 to the UE but they have not been acknowledged by the UE.

During the handover, N_firstRlcPduFromTarget (or RLC SN) is determined by cell #1 and notified to cell #2 in the message called "RLC SN transfer". The source cell determines that there are no PDCP SDUs across the RLC SN boundary. The corresponding RLC PDUs with SN<N_firstRlcPduFromTarget are forwarded to cell #2 from cell #1. All other PDCP packets not included in the forwarded RLC PDUs are forwarded in plain text to cell #2 from cell #1.

After the handover, Cell #2 sends the RLC PDU with sequence number N_firstRlcPduFromTarget first to the UE. It sets the polling flag in the header of this RLC PDU to notify the UE to report its RLC status. Cell #2 will wait for the acknowledgement from the UE before sending the forwarded RLC PDUs and the other RLC PDUs.

After the handover, the UE receives a first RLC PDU from cell #2 containing a PDCP SDU encrypted using the encryption key from cell #2. The first RLC PDU's sequence number, i.e., N_firstRlcPduFromTarget, is treated as an encryption demarcation point. Indeed, the RLC PDUs having a sequence number inferior to that SN carry PDCP SDUs encrypted using the encryption key from cell #1, while those that have a sequence number superior to that SN carry PDCP SDUs encrypted using the encryption key from cell #2. As for the stack arrays illustrated in FIG. 7, the following can be observed:

Before the handover, the UE has N_firstRlcPduFromTargetStack[1]=−1, keyCellStack[0]=cell #1 and M=1.

Once the first RLC PDU is received, the UE has N_firstRlcPduFromTargetStack[0]=N_firstRlcPduFromTarget, N_firstRlcPduFromTargetStack[1]=−1, keyCellStack[0]=cell #2, keyCellStack[1]=cell #1 and M=2.

Once RLC PDUs with SN<N_firstRlcPduFromTargetStack[0] have been received, the UE will set N_firstRlcPduFromTargetStack[0] to −1 and delete the bottom elements so the UE will have N_firstRlcPduFromTargetStack[0]=−1, keyCellStack[0]=cell #2 and M=1.

Now, a few special cases related to the above example will be described.

For example, in case the UE does not receive the first RLC PDU with sequence number N_firstRlcPduFromTarget, cell #2 will retransmit it to the UE. All the other RLC PDUs are held back (i.e. not sent to the UE). As the first RLC PDU may have a delivery problem, there is no need to deliver the others.

As another example, it is possible that the UE received the first RLC PDU but cell #2 does not know that. In this case, cell #2 will retransmit the first RLC PDU to the UE. All the other RLC PDUs are held back. If finally the UE receives the duplicated RLC PDU, according to the procedure in FIG. 7, the UE will replace N_firstRlcPduFromTargetStack[0] and keyCellStack[0] with the information from the duplicate RLC PDU.

In another example, the following is considered: a UE is in a handover from cell #1 to cell #2, the UE has received the first RLC PDU and then immediately cell #2 decides to do another handover, from cell #2 to cell #1.

The handover for the UE from cell #1 to cell #2 is as described above. At the UE's side, after the handover from cell #1 to cell #2, the UE has N_firstRlcPduFromTargetStack[0]=N_firstRlcPduFromTarget from cell #2, N_firstRlcPduFromTargetStack[1]=−1, keyCellStack[0]=cell #2, keyCellStack[1]=cell #1, and M=2.

For the next handover, from cell #2 back to cell #1, the procedure is the same as what has been described above, except that the source and target cells are swapped. At the UE side, however, it is assumed that not all the RLC PDUs with SN<N_firstRlcPduFromTargetStack[0] have been received. That means that: before the handover from cell #2 to cell #1, the UE has N_firstRlcPduFromTargetStack[0]=N_firstRlcPduFromTarget from cell #2, N_firstRlcPduFromTargetStack[1]=−1, keyCellStack[0]=cell #2, keyCellStack[1]=cell #1 and M=2.

Once a first RLC PDU from cell #1 (in handover from cell #2 back to cell #1) is received, the UE has N_firstRlcPduFromTargetStack[0]=N_firstRlcPduFromTarget from cell #1, N_firstRlcPduFromTargetStack[1]=N_firstRlcPduFromTarget from cell #2, N_firstRlcPduFromTargetStack[2]=−1, keyCellStack[0]=cell #1, keyCellStack[1]=cell #2, keyCellStack[2]=cell #1 and M=3.

If all the RLC PDUs with SN<N_firstRlcPduFromTargetStack[1] have been received, the UE can set N_firstRlcPduFromTargetStack[1] to −1, delete N_firstRlcPduFromTargetStack[2] and keyCellStack[2], and decrease M by 1.

After that, if all RLC PDUs with SN<N_firstRlcPduFromTargetStack[0] have been received, the UE can further set N_firstRlcPduFromTargetStack[0] to −1, delete N_firstRlcPduFromTargetStack[1] and keyCellStack[1], and decrease M by 1.

One may ask what if N_firstRlcPduFromTargetStack[0] is the same as N_firstRlcPduFromTargetStack[1], which means that the same RLC PDU sent from cell #2 in the first handover is resent from cell #1 in the second handover and there is no other RLC PDUs in between. When this happens, the SN of the first RLC PDU is the same as N_firstRlcPduFromTargetStack[0], the UE will do a key replacement in keyCellStack[ ] and will not do any insertion. In this case, the UE has N_firstRlcPduFromTargetStack[0]=N_firstRlcPduFromTarget from cell #1, N_firstRlcPduFromTargetStack[1]=−1, keyCellStack[0]=cell #1, keyCellStack[1]=cell #1 and M=2.

In yet another example, the following is considered: a UE is in a handover from cell #1 to cell #2 and the UE has received the first RLC PDU and then immediately cell #2 decides to do another handover from cell #2 to cell #3.

For the handover of the UE from cell #1 to cell #2, the procedure is as described above. At the UE's side, after the cell #1 to cell #2 handover, the UE has:
N_firstRlcPduFromTargetStack[0]=N_firstRlcPduFromTarget, N_firstRlcPduFromTargetStack[1]=−1, keyCellStack[0]=cell #2, keyCellStack[1]=cell #1 and M=2.

For the next handover from cell #2 back to cell #3, the procedure is the same as described above, except that the source and target cells are cell #2 and cell #3, respectively. At the UE side, however, it is assumed that not all the RLC PDUs with SN<N_firstRlcPduFromTargetStack[0] have been received. That means that: before the handover from cell #2 to cell #3, the UE has N_firstRlcPduFromTargetStack[0]=N_firstRlcPduFromTarget from cell #2, N_firstRlcPduFromTargetStack[1]=−1, keyCellStack[0]=cell #2, keyCellStack[1]=cell #1 and M=2.

Once a first RLC PDU from cell #3 is received, the UE has N_firstRlcPduFromTargetStack[0]=N_firstRlcPduFromTarget from cell #3, N_firstRlcPduFromTargetStack[1]=N_firstRlcPduFromTarget from cell #2, N_firstRlcPduFromTargetStack[2]=−1, keyCellStack[0]=cell #3, keyCellStack[1]=cell #2, keyCellStack[2]=cell #1 and M=3.

If all the RLC PDUs with SN<N_firstRlcPduFromTargetStack[1] have been received, the UE can set N_firstRlcPduFromTargetStack[1] to −1, delete N_firstRlcPduFromTargetStack[2] and keyCellStack[2], and decrease M by 1.

After that, if all the RLC PDUs with SN<N_firstRlcPduFromTargetStack[0] have been received, the UE can further set N_firstRlcPduFromTargetStack[0] to −1, delete N_firstRlcPduFromTargetStack[1] and keyCellStack[1], and decrease M by 1.

Figure 8:
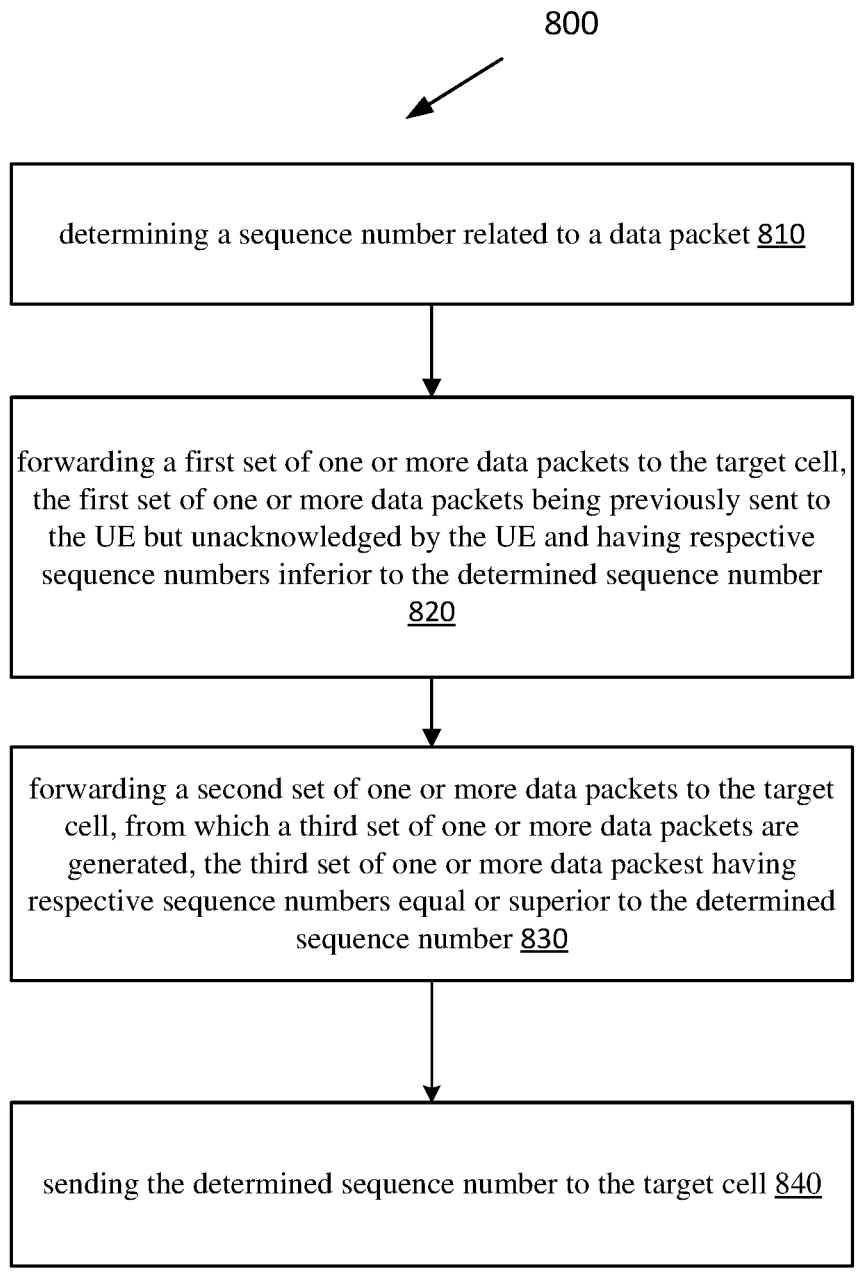
FIG. 8 is a flow chart of a method for packet forwarding during a handover from a source cell to a target cell, in accordance with some embodiments.

Now turning to FIG. 8, a flow chart of a method 800 for forwarding data packets during a handover of a UE from a source cell to a target cell, according to an embodiment, will be described. The method can be implemented in a network node that services the source cell, for example.

Method 800 comprises the following steps:

Step 810: determining a sequence number related to a data packet;

Step 820: forwarding a first set of one or more data packets to the target cell, the first set of one or more data packets being previously sent to the UE but unacknowledged by the UE and having respective sequence numbers inferior to the determined sequence number;

Step 830: forwarding to the target cell a second set of one or more data packets, from which a third set of one or more data packets are generated, the third set of one or more data packets having respective sequence numbers equal or superior to the determined sequence number;

Step 840: sending the determined sequence number to the target cell.

The details regarding the different steps 810 to 840 have been described above.

More specifically, in some embodiments, the first set of one or more data packets are Radio Link Control packets or PDUs.

In some embodiments, the first set of one or more data packets are forwarded using a first channel at the RLC layer (e.g. 420).

In some embodiments, the second set of one or more data packets are PDCP packets (or PDUs) and the third set of one or more data packets are RLC packets generated from the PDCP packets, the RLC packets having sequence numbers equal or superior to the determined sequence number.

In some embodiments, the first set of one or more data packets (e.g. RLC packets) are encrypted using an encryption key of the source cell. More specifically, the PDCP packets carried by these RLC packets are encrypted using the encryption key of the source cell.

In some embodiments, the second set of one or more data packets are forwarded unencrypted. For example, the PDCP packets are forwarded using a second channel at the PDCP layer. Once these packets are received by the target cell, the target cell encrypts them and then segments them to generate the corresponding RLC packets.

In some embodiments, the network node of the source cell determines a sequence number under which a whole PDCP packet is carried by a plurality of RLC packets such that the plurality of RLC packets have respective sequence numbers inferior to the determined sequence number. To do so, the network node of the source cell determines a last RLC PDU that ends with a last piece of a PDCP packet. Then, the sequence number of the last RLC PDU is incremented by 1 to obtain the determined (desired) sequence number.

Figure 9:
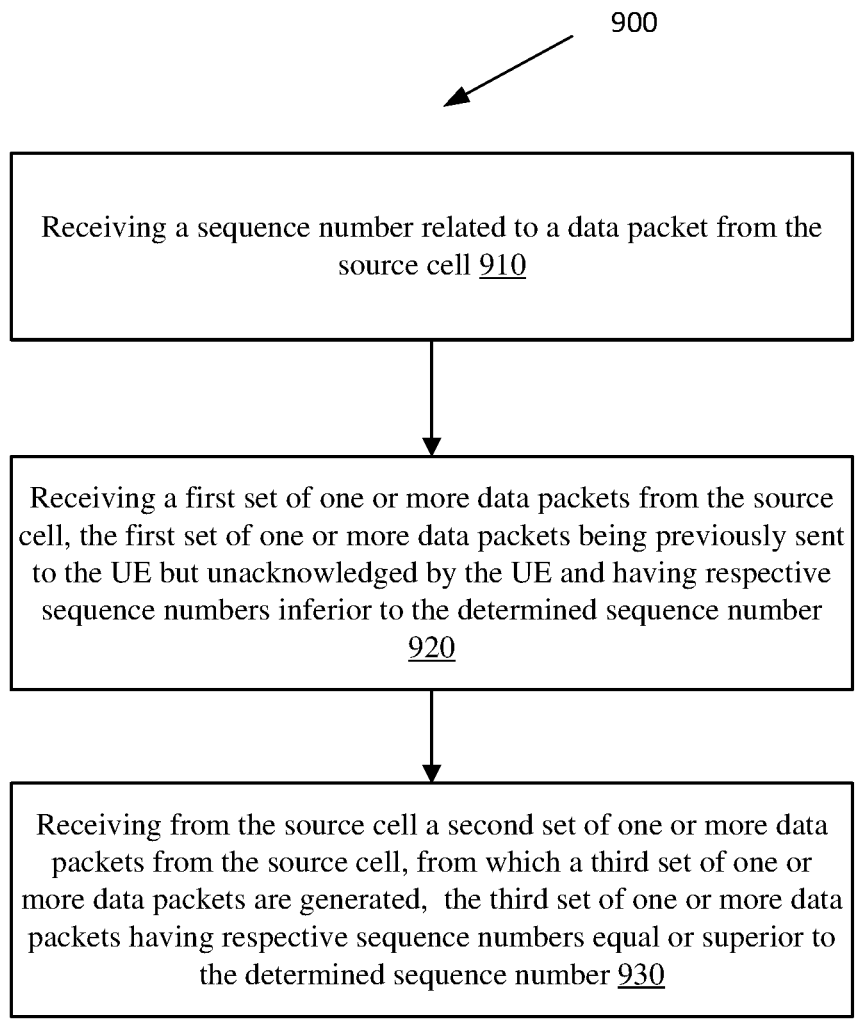
FIG. 9 is a flow chart of another method for packet forwarding during a handover from a source cell to a target cell, in accordance with some embodiments.

Now turning to FIG. 9, a flow chart of a method 900 for forwarding data packets during a handover of a UE from a source cell to a target cell, according to an embodiment, will be described.

The method can be implemented in a network node that services the target cell, for example.

Method 900 comprises the following steps:

Step 910: receiving a sequence number related to a data packet from the source cell.

Step 920: receiving a first set of one or more data packets from the source cell, the first set of one or more data packets being previously sent to the UE but unacknowledged by the UE and having respective sequence numbers inferior to the determined sequence number Step 930: receiving from the source cell a second set of one or more data packets, from which a third set of one or more data packets are generated, the third set of one or more data packets having respective sequence numbers equal or superior to the determined sequence number.

The details relating to each step of method 900 have been described above.

For example, in some embodiments, the first set of one or more data packets are Radio Link Control packets.

In some embodiments, the first set of one or more data packets are received from the source cell, using a first channel at the RLC layer (e.g. 420).

In some embodiments, the second set of one or more data packets are PDCP packets and the third set of one or more data packets are corresponding RLC packets, which are generated from the second set, the corresponding RLC packets having respective sequence numbers equal or superior to the determined sequence number.

In some embodiments, the second set of one or more data packets are received unencrypted from the source cell.

In some embodiments, the second set of one or more data packets are received in a second channel at the PDCP layer (e.g. 410).

In some embodiments, the target cell encrypts the second set of one or more data packets, i.e. the target cell encrypts the PDCP packets, using the encryption key of the target cell.

In some embodiments, the target cell sends a first data packet from the third set to the UE, after the handover, the first data packet having the determined sequence number.

In some embodiments, the target cell receives an acknowledgement from the UE indicating that the first data packet is successfully received.

In some embodiments, the method sets a polling flag in the header of the first data packet to trigger the UE to immediately feedback an acknowledgement of the first data packet.

In some embodiments, the acknowledgement of the first data packet received from the UE is used to synchronize the target cell with the UE based on the determined sequence number, the first data packet being an indication to UE that decryption of PDCP PDUs carried in RLC PDUs having sequence numbers inferior to the determined sequence number need to use an encryption key from the source cell and decryption of PDCP PDUs carried in RLC PDUs having sequence numbers superior to the determined sequence number need to use an encryption key from the target cell.

In some embodiments, the method comprises suspending all other RLC PDUs transmission after the first data packet is sent to UE until the acknowledgement of the first data packet is received from UE.

In some embodiments, the target cell sends the rest of the data packets from the third set of one or more data packets to the UE.

In some embodiments, the target cell sends the first set of one or more data to the UE.

Now turning to FIG. 10A, a flow chart of a method 1000 for synchronizing a UE (or wireless device) with a target cell, after a handover of the UE from a source cell to the target cell, according to an embodiment, will be described. The method can be implemented in a wireless device node, for example.

Method 1000 comprises:

Step 1010: receiving a first data packet, the first data packet having a first sequence number;

Step 1020: sending an acknowledgement for the receipt of the first data packet to the target cell;

Step 1030: receiving one or more data packets having respective sequence numbers inferior to the first sequence number;

Step 1040: receiving one or more data packets having respective sequence numbers superior to the first sequence number;

Step 1050: decrypting the one or more packets having respective sequence numbers inferior to the first sequence number using an encryption key from the source cell;

Step 1060: decrypting the first data packet and the one or more packets having respective sequence numbers superior to the first sequence number using an encryption key from the target cell.

In some embodiments, the wireless device can store a set of encryption keys from several previous cells on a handover path involving multiple cells.

In some embodiments, the wireless device can use the set of encryption keys to properly decrypt respective received data packets.

In some embodiments, the receipt of the first data packet with the first sequence number after the handover indicates a demarcation line between the encryption key from the source cell and the encryption key from the target cell.

In some embodiments, the method comprises storing a set of encryption keys corresponding to a set of demarcation lines associated with a set of different first sequence numbers from several previous cells along a consecutive handover path involving multiple cells.

In some embodiments, the method comprises using the set of encryption keys to properly decrypt respective received data packets by comparing the sequence numbers of the received data packets with the set of different first sequence numbers.

FIG. 10B illustrates a flow chart of a method 1070 in a target cell, for synchronizing with a wireless device, after a handover of the wireless device from a source cell to the target cell, according to an embodiment. The method 1070 comprises:

Step 1075: Sending to the wireless device a first data packet having a first sequence number.

Step 1080: Receiving an acknowledgement associated with the sent first data packet.

Step 1085: Sending a first set of one or more data packets having respective sequence numbers inferior to the first sequence number.

Step 1090: Sending a second set of one or more data packets having respective sequence numbers superior to the first sequence number.

Figure 11:
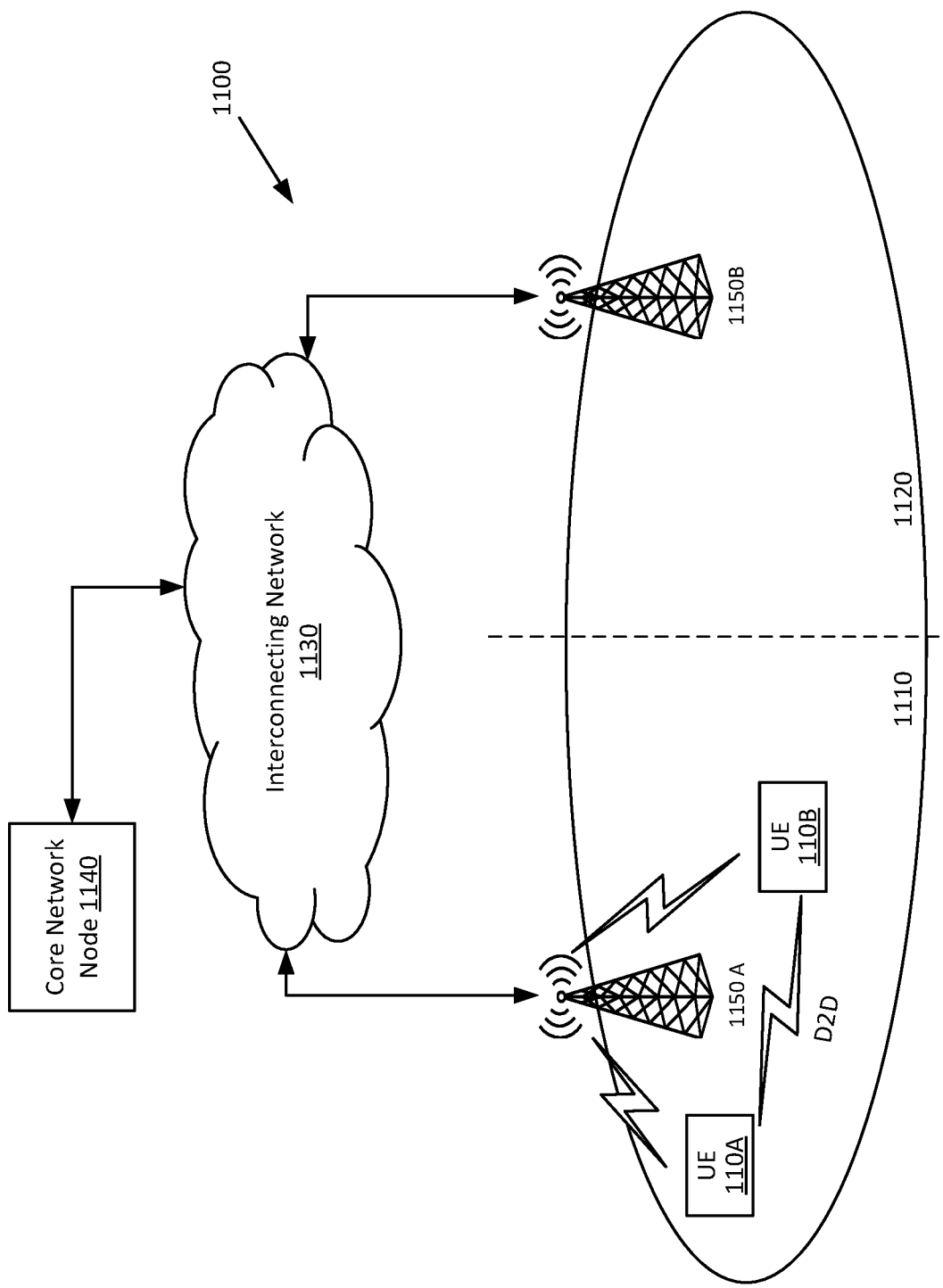
FIG. 11 illustrates one example of a wireless communications system in which embodiments of the present disclosure may be implemented.

The present disclosure contemplates that the various embodiments described herein may be applied to a variety of networks such as the one shown in FIG. 11.

FIG. 11 illustrates an example of a wireless network 1100 that may be used for wireless communications. Wireless network 1100 includes UEs 110A-110B (collectively referred to as UE or UEs 110) and a plurality of radio network nodes 1150A-1a50B (e.g., Node Bs (NBs) Radio Network Controllers (RNCs), evolved NBs (eNBs), next generation NB (gNBs), etc.) (collectively referred to as network nodes 1150) directly or indirectly connected to a core network 1130 which may comprise various core network nodes. For example, network node 1150A may service a source cell having a coverage area 1110 and network node 1150B may service a target cell 130 having a coverage area 1120. The coverage area 1110 may be equivalent to the source cell 120 and the coverage area 1120 may be equivalent to target cell 120. The network 1100 may use any suitable radio access network (RAN) deployment scenarios, including Universal Mobile Telecommunication System (UMTS) Terrestrial Radio Access Network (UTRAN), and Evolved UNITS Terrestrial Radio Access Network (EU-TRAN). UEs 110A and 110B within coverage areas 1110 may each be capable of communicating directly with radio network nodes 1120 over a wireless interface. In certain embodiments, UEs may also be capable of communicating with each other via device-to-device (D2D) communication. In certain embodiments, network nodes 120 and 130 may also be capable of communicating with each other, e.g. via an interface (e.g. X2 in LTE or other suitable interface).

As an example, UE 110A may communicate with radio network node 1150 over a wireless interface. That is, UE 110A may transmit wireless signals to and/or receive wireless signals from radio network node 1150. The wireless signals may contain voice traffic, data traffic, control signals, and/or any other suitable information. In some embodiments, an area of wireless signal coverage associated with a radio network node 1150 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 310 are described in more detail below with respect to Figures xx and xx.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 1150 may interface with a radio network controller (not shown). The radio network controller may control network nodes 1150 and may provide certain radio resource management functions, mobility management functions, and/or other suitable functions. In certain embodiments, the functions of the radio network controller may be included in the network node 1150. The radio network controller may interface with the core network node 1140. In certain embodiments, the radio network controller may interface with the core network node 1140 via the interconnecting network 1130.

The interconnecting network 1130 may refer to any interconnecting system capable of transmitting audio, video, signals, data, messages, or any combination of the preceding. The interconnecting network 1130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 1140 may manage the establishment of communication sessions and various other functionalities for wireless devices 110. Examples of core network node 1140 may include MSC, MME, SGW, PGW, O&M, OSS, SON, positioning node (e.g. E-SMLC), MDT node, etc. Wireless devices 110 may exchange certain signals with the core network node 1140 using the non-access stratum layer. In non-access stratum signaling, signals between wireless devices 110 and the core network node 1140 may be transparently passed through the radio access network. In certain embodiments, network nodes 1150 may interface with one or more other network nodes over an internode interface. For example, network nodes 1150 may interface each other over an X2 interface.

Although FIG. 11 illustrates a particular arrangement of network 1100, the present disclosure contemplates that the various embodiments described herein may be applied to a variety of networks having any suitable configuration. For example, network 1100 may include any suitable number of wireless devices 110 and network nodes 1150, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 12:
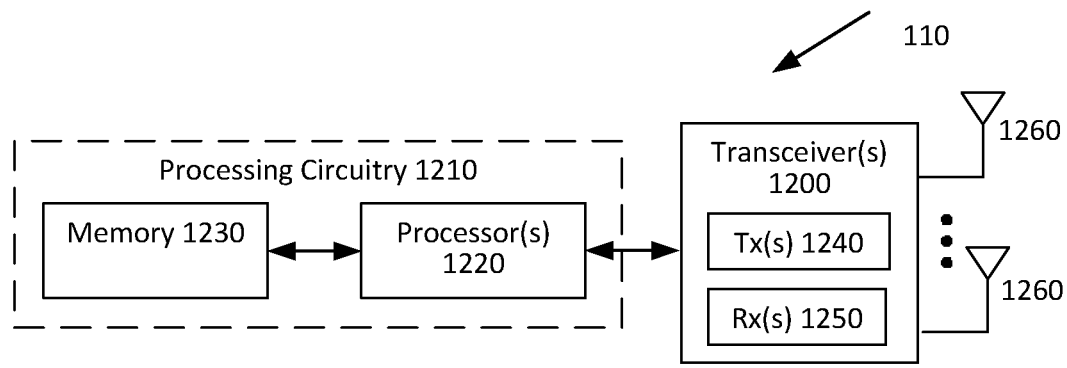
FIGS. 12 and 13 are block diagrams that illustrate a wireless device according to some embodiments of the present disclosure.

FIG. 12 is a schematic block diagram of the wireless device 110 according to some embodiments of the present disclosure. As illustrated, the wireless device 110 includes circuitry 1210 comprising one or more processors 1220 (e.g., Central Processing Units (CPUs), Application Specific Integrated Circuits (ASICs), Field Programmable Gate Arrays (FPGAs), and/or the like) and memory 1230. The wireless device 110 also includes one or more transceivers 1200 each including one or more transmitter 1240 and one or more receivers 1250 coupled to one or more antennas 1260. In some embodiments, the functionality of the wireless device 110 described above may be fully or partially implemented in software that is, e.g., stored in the memory 1230 and executed by the processor(s) 1220. For example, the processor 1220 is configured to perform method 1000 of FIG. 10.

Figure 10:
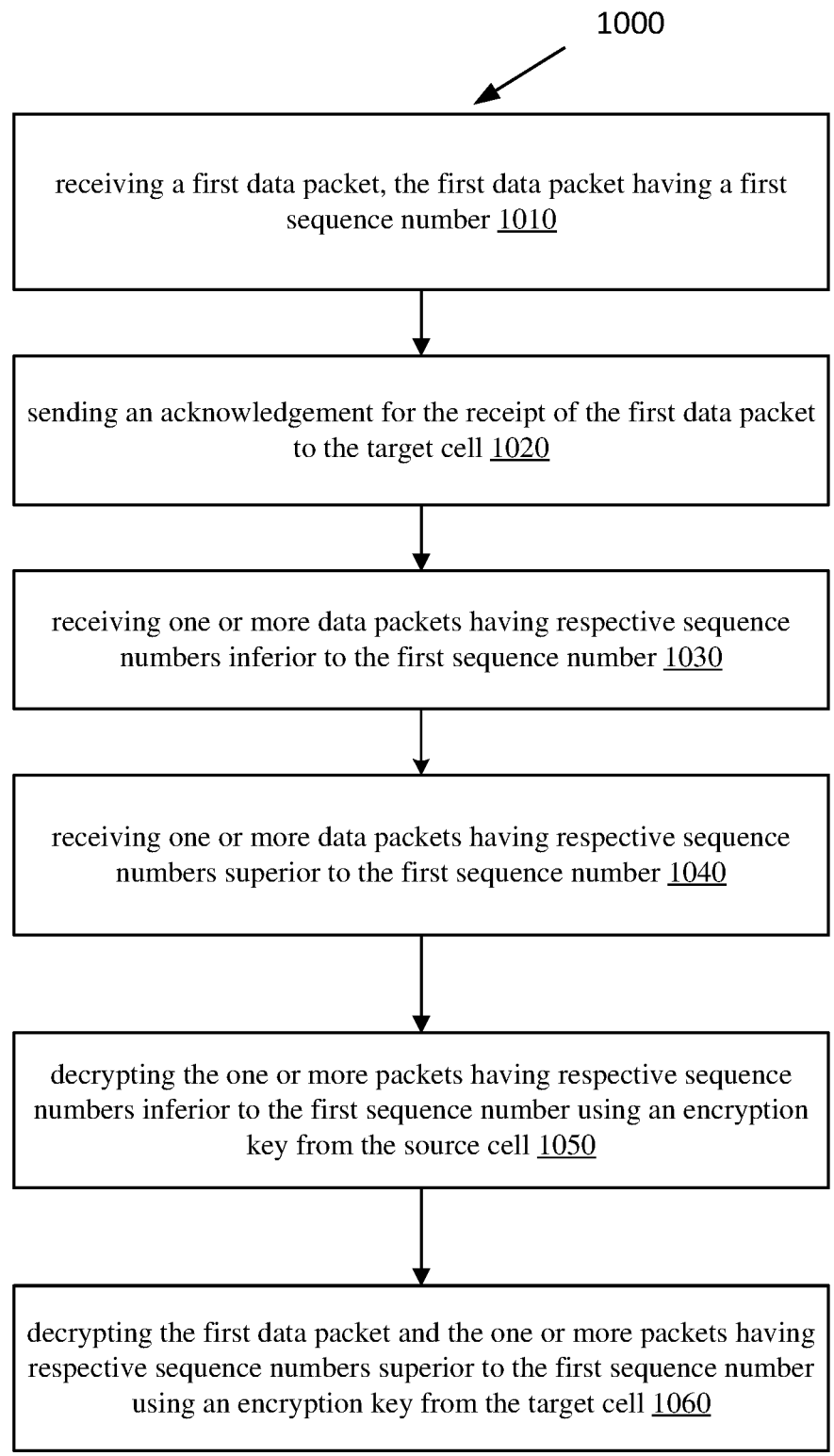
FIG. 10A is a flow chart of a method for synchronizing a wireless device with a target cell, after a handover in accordance with some embodiments.
FIG. 10B is a flow chart of another method for synchronizing a wireless device with a target cell, after a handover in accordance with some embodiments.
Figure 10:
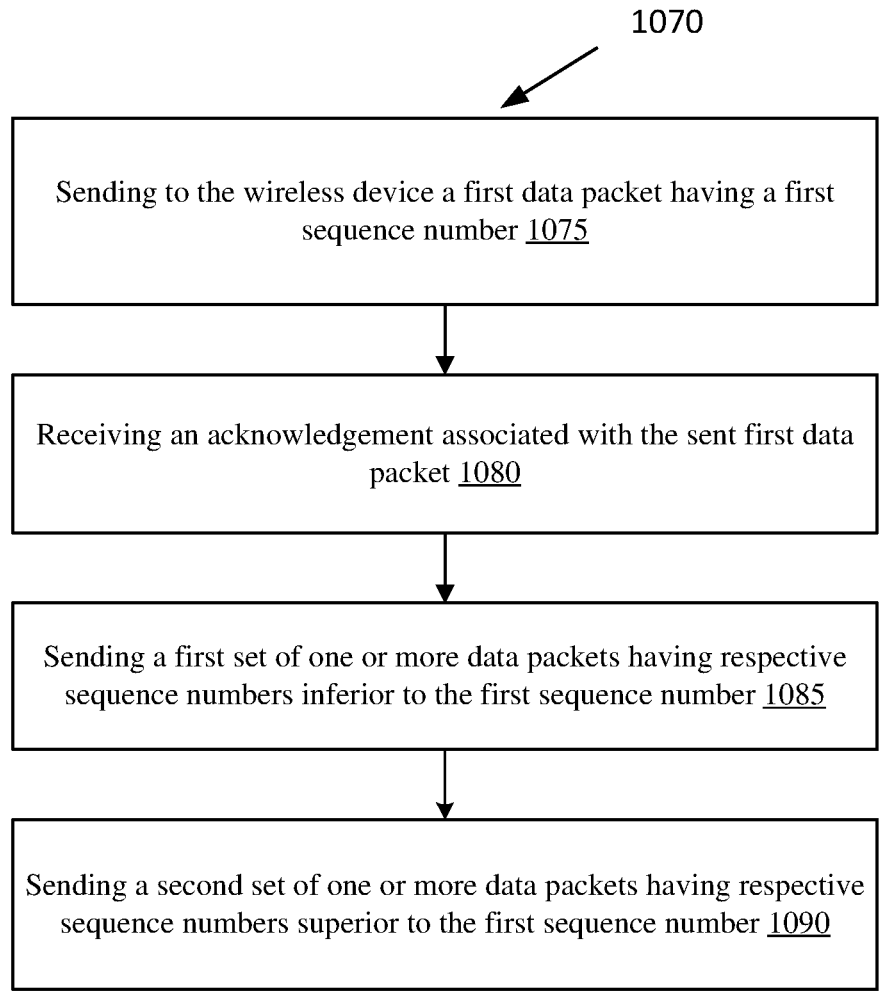

In some embodiments, a computer program including instructions which, when executed by the at least one processor 1220, causes the at least one processor 1220 to carry out the functionality of the wireless device 110 according to any of the embodiments described herein is provided (e.g. method 1000 of FIG. 10). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
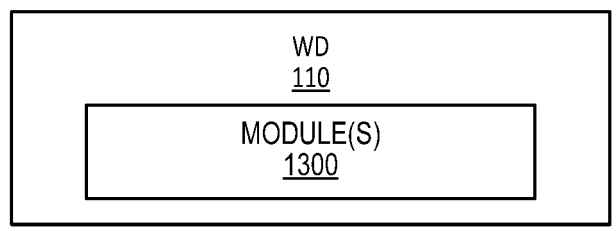

FIG. 13 is a schematic block diagram of the wireless device 110 according to some other embodiments of the present disclosure. The wireless device 110 includes one or more modules 1300, each of which is implemented in software. The module(s) 1300 provide the functionality of the wireless device 110 described herein. The module(s) 1300 may comprise, for example, a receiving module operable to perform steps 1010, 1030 and 1040 of FIG. 10A. The module(s) 1300 may further comprise a sending module operable to perform step 1020 of FIG. 10A The module(s) 1300 may further comprise a decrypting module operable to perform steps 1050 and 1060 of FIG. 10A.

Figure 14:
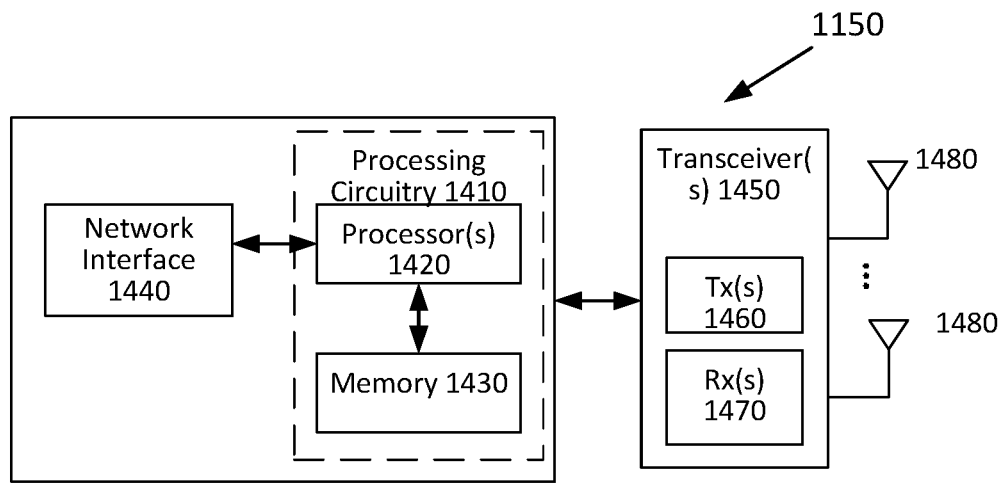
FIGS. 14 and 15 are block diagrams that illustrate a network node according to some embodiments of the present disclosure.

FIG. 14 is a schematic block diagram of a network node 1150 of either the source cell 120 or target cell 130 according to some embodiments of the present disclosure. As illustrated, the network node 1150 includes a processing circuitry 1410 comprising one or more processors 1420 (e.g., CPUs, ASICs, FPGAs, and/or the like) and memory 1430. The network node also comprises a network interface 1440. The network node 1150 also includes one or more transceivers 1450 that each include one or more transmitters 1460 and one or more receivers 1470 coupled to one or more antennas 1480. In some embodiments, the functionality of the network node 1150 described above may be fully or partially implemented in software that is, e.g., stored in the memory 1430 and executed by the processor(s) 1420. For example, the processor 1420 can be configured to perform the method 800 of FIG. 8 or method 900 of FIG. 9 or method 1070 of FIG. 10B.

Figure 15:
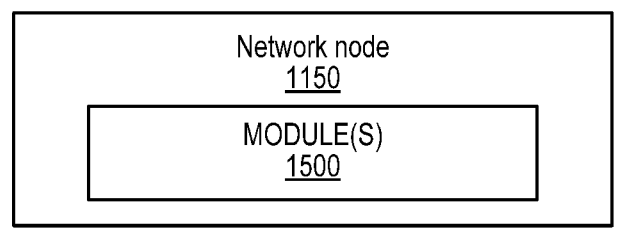

FIG. 15 is a schematic block diagram of the network node 1150 according to some other embodiments of the present disclosure. The network node 1150 includes one or more modules 1500, each of which is implemented in software. The module(s) 1500 provide the functionality of the network node 1150 described herein. When the network node 1150 is at the source cell, the module(s) 1500 may comprise, for example, a determining module operable to perform steps 810 of FIG. 8, a forwarding module operable to perform steps 820 and 830 of FIG. 8 and a sending module operable to perform step 840 of FIG. 8. When the network node 1150 is at the target cell, the modules 1500 may comprise a receiving module operable to perform steps 910, 920 and 930 of FIG. 9. Furthermore, the receiving modules of the network node 1150 at the target cell may be operable to perform steps 1080 of method 1070 in FIG. 10B. The network node 1150 may further comprise a sending module operable to perform steps 1075, 1085 and 1090 of method 1070 in FIG. 10B.

Figure 16:
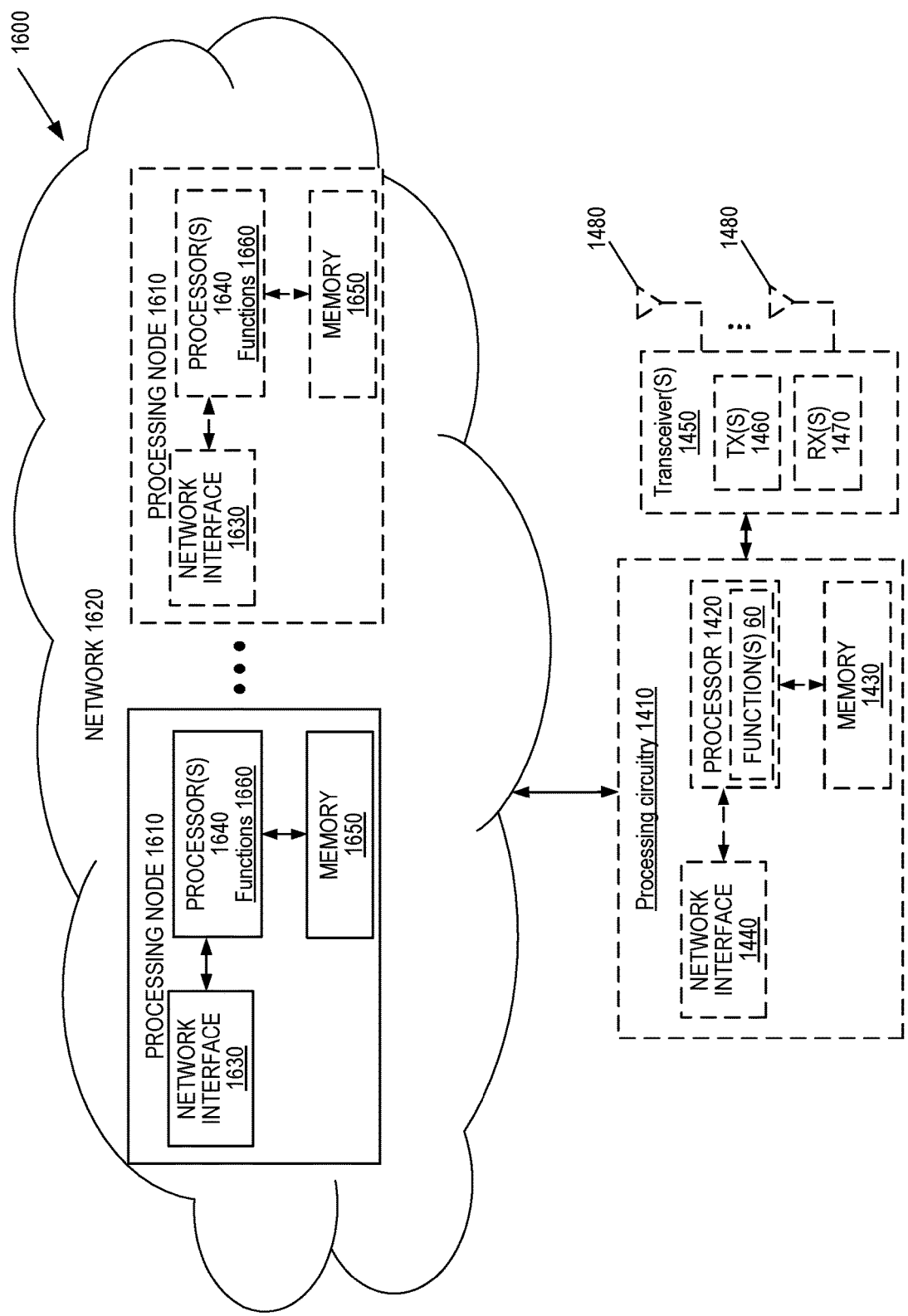
FIG. 16 illustrates a virtualized environment of a network node, according to some embodiments of the present disclosure.

FIG. 16 is a schematic block diagram that illustrates a virtualized embodiment of the network node 1150, according to some embodiments of the present disclosure. As used herein, a "virtualized" network node 1600 is a network node 1600 in which at least a portion of the functionality of the network node 1600 is implemented as a virtual component (e.g., via a virtual machine(s) executing on a physical processing node(s) in a network(s)). As illustrated, if the network node 1600 is the radio access node 1150, the network node 1600 also includes the one or more transceivers 1480, as described with respect to FIG. 14. The network node 1600 includes one or more processing nodes 1610 coupled to or included as part of a network(s) 1620 via the network interface 1630. Alternatively, all of the functionality of the network node 1600 described herein may be implemented in the processing nodes 1610. Each processing node 1610 includes one or more processors 1640 (e.g., CPUs, ASICs, FPGAs, and/or the like), memory 1650, and a network interface 1630.

In this example, functions 1660 of the network node 1600 described herein are implemented at the one or more processing nodes 1640 in any desired manner. In some particular embodiments, some or all of the functions 1660 of the network node 1600 described herein are implemented as virtual components executed by one or more virtual machines implemented in a virtual environment(s) hosted by the processing node(s) 1640. As will be appreciated by one of ordinary skill in the art, additional signaling or communication between the processing node(s) 1660 and the transceivers 1450 (if present) is used in order to carry out at least some of the desired functions.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A network node of a source cell configured to forward data packets during a handover of a User Equipment (UE) from the source cell to a target cell, the network node comprising:
a communication interface; and
a processing circuit communicatively connected to the communication interface, and the processing circuit is configured to:
determine a sequence number related to a data packet;
forward a first set of one or more data packets to the target cell, the first set of one or more data packets being previously sent to the UE but unacknowledged by the UE and having respective sequence numbers lower to the determined sequence number;
forward to the target cell a second set of one or more data packets, wherein the target cell is configured to generate a third set of one or more data packets from the second set of one or more data packets, the third set of one or more data packets having respective sequence numbers equal or higher to the determined sequence number, wherein the processing circuit is configured to forward the second set of one or more data packets unencrypted; and
send the determined sequence number to the target cell, wherein the determined sequence number corresponds to a demarcation line between an encryption key from the source cell and an encryption key from the target cell.

2. The network node of claim 1, wherein the first set of one or more data packets are Radio Link Control (RLC) Packet Data Units (PDUs) and the second set of one or more data packets are Packet Data Convergence Protocol (PDCP) PDUs and the third set of one or more data packets are RLC PDUs generated from the PDCP PDUs.

3. The network node of claim 2, wherein the processing circuit is configured to forward the first set of one or more data packets using a first channel at a RLC layer.

4. The network node of claim 1, wherein the processing circuit is configured to encrypt the first set of one or more data packets using the encryption key of the source cell.

5. The network node of claim 2, wherein the processing circuit is configured to encrypt PDCP PDUs carried by the first set of one or more data packets.

6. The network node of claim 2, wherein the processing circuit is configured to forward the second set of one or more data packets using a second channel at a PDCP layer.

7. The network node of claim 2, wherein the processing circuit is configured to determine a sequence number under which a whole PDCP PDU is carried by a plurality of RLC PDUs such that the plurality of RLC PDUs have respective sequence numbers lower to the sequence number related to the data packet.

8. A network node of a target cell for forwarding data packets during a handover of a User Equipment (UE) from a source cell to the target cell, the network node comprising:
a communication interface; and
a processing circuit communicatively connected to the communication interface, and the processing circuit is configured to:
receive a sequence number related to a data packet from the source cell;
receive a first set of one or more data packets from the source cell, the first set of one or more data packets being previously sent to the UE but unacknowledged by the UE and having respective sequence numbers lower to the received sequence number;
receive from the source cell a second set of one or more data packets, wherein the target cell is configured to generate a third set of one or more data packets from the second set of one or more data packets, the third set of one or more data packets having respective sequence numbers equal or higher to the received sequence number, wherein the processing circuit is further configured to:
send, to the UE, a first data packet from the third set of one or more data packets, the first data packet having the received sequence number, after the handover,
receive an acknowledgement from the UE indicating that the first data packet has been successfully received, and
use the acknowledgement received from the UE to synchronize the target cell with the UE based on the received sequence number, the first data packet being an indication to the UE that decryption of Packet Data Convergence Protocol (PDCP) Packet Data Units (PDUs) carried in Radio Link Control (RLC) PDUs having sequence numbers lower to the received sequence number need to use an encryption key from the source cell and decryption of PDCP PDUs carried in RLC PDUs having sequence numbers equal or higher to the received sequence number need to use an encryption key from the target cell.

9. The network node of claim 8, wherein the first set of one or more data packets are RLC PDUs and the second set of one or more data packets are PDCP PDUs and wherein the third set of one or more data packets are RLC PDUs generated by the target cell from the second set of one or more data packets.

10. The network node of claim 8, wherein the processing circuit is configured to suspend all RLC PDUs transmissions after the first data packet is sent to the UE until the acknowledgement is received from the UE.

11. The network node of claim 8, wherein the processing circuit is configured to send the first set of one or more data packets to the UE and send any remaining data packets from the third set of one or more data packets to the UE.

12. A wireless device for synchronizing with a target cell, after a handover from a source cell to the target cell, the wireless device comprising:
a communication interface; and
a processing circuit communicatively connected to the communication interface, and the processing circuit is configured to:
receive a first data packet from the target cell, the first data packet having a first sequence number;
send an acknowledgement for the receipt of the first data packet to the target cell;
receive one or more data packets having respective sequence numbers lower to the first sequence number;
receive one or more data packets having respective sequence numbers higher to the first sequence number;
decrypt the one or more data packets having respective sequence numbers lower to the first sequence number using an encryption key from the source cell;
decrypt the first data packet and the one or more data packets having respective sequence numbers higher to the first sequence number using an encryption key from the target cell, wherein the receipt of the first data packet having the first sequence number after the handover indicates a demarcation line between the encryption key from the source cell and the encryption key from the target cell.

13. The wireless device of claim 12, wherein the processing circuit is configured to store a set of encryption keys corresponding to a set of demarcation lines associated with a set of first sequence numbers from several previous cells along a consecutive handover path involving multiple cells.

14. The wireless device of claim 13, wherein the processing circuit is configured to use the set of encryption keys to properly decrypt respective received data packets by comparing sequence numbers of the received data packets with the set of first sequence numbers.

15. A method in a communication network in which a handover of a wireless device occurs, the wireless device moving from a source cell to a target cell, the method comprising:
   at the source cell:
      determining a sequence number related to a data packet;
      forwarding a first set of one or more data packets to the target cell, the first set of one or more data packets being previously sent to the wireless device but unacknowledged by the wireless device, and having respective sequence numbers lower to the determined sequence number;
      forwarding to the target cell a second set of one or more data packets, from which a third set of one or more data packets are generated, the third set of one or more data packets having respective sequence number equal or higher to the determined sequence number; and
      sending the determined sequence number to the target cell;
   at the target cell:
      sending a first data packet with the determined sequence number to the wireless device;
      receiving an acknowledgement associated with the sent first data packet from the wireless device;
      sending the first set of one or more data packets having respective sequence numbers lower to the determined sequence number; and
      sending a second set of one or more data packets having respective sequence numbers higher to the determined sequence number;
   at the wireless device:
      receiving the first data packet from the target cell after the handover, the first data packet having the determined sequence number;
      decrypting the first set of one or more data packets having respective sequence numbers lower to the determined sequence number using an encryption key from the source cell; and
      decrypting the first data packet and the second set of one or more data packets having respective sequence numbers higher to the determined sequence number using an encryption key from the target cell, wherein the receipt of the first data packet with the determined sequence number after the handover indicates a demarcation line between the encryption key from the source cell and the encryption key from the target cell.

* * * * *